United States Patent [19]

Gaborski

[11] Patent Number: 5,052,043
[45] Date of Patent: Sep. 24, 1991

[54] NEURAL NETWORK WITH BACK PROPAGATION CONTROLLED THROUGH AN OUTPUT CONFIDENCE MEASURE

[75] Inventor: Roger S. Gaborski, Pittsford, N.Y.

[73] Assignee: Eastman Kodak Company, Rochester, N.Y.

[21] Appl. No.: 520,334

[22] Filed: May 7, 1990

[51] Int. Cl.[5] .............................................. G06K 9/66
[52] U.S. Cl. ........................................ 382/14; 382/27; 364/274.9; 364/513
[58] Field of Search ................. 382/14, 27; 364/274.9, 364/513

[56] References Cited

U.S. PATENT DOCUMENTS

| | | | |
|---|---|---|---|
| 3,192,505 | 6/1965 | Rosenblatt | 340/146.3 |
| 3,267,439 | 8/1966 | Bonner | 340/172.5 |
| 3,275,985 | 9/1966 | Dunn et al. | 340/146.3 |
| 3,275,986 | 9/1966 | Dunn et al. | 340/146.3 |
| 3,646,329 | 2/1972 | Yoshino et al. | 235/150.1 |
| 4,479,241 | 10/1984 | Buckley | 382/15 |
| 4,504,970 | 3/1985 | Werth et al. | 382/14 |
| 4,682,365 | 7/1987 | Orita et al. | 382/14 |
| 4,742,556 | 5/1988 | Davis, Jr. et al. | 382/51 |
| 4,748,674 | 5/1988 | Freeman | 382/14 |
| 4,873,661 | 10/1989 | Tsividis | 364/807 |
| 4,876,731 | 10/1989 | Loris et al. | 382/40 |
| 4,884,216 | 11/1989 | Kuperstein | 364/513 |
| 4,885,757 | 12/1989 | Provence | 375/96 |
| 4,912,649 | 3/1990 | Wood | 364/513 |
| 4,912,651 | 3/1990 | Wood et al. | 364/513 |
| 4,912,652 | 3/1990 | Wood | 364/513 |
| 4,912,654 | 3/1990 | Wood | 364/513 |
| 4,912,655 | 3/1990 | Wood | 364/513 |
| 4,918,618 | 4/1990 | Tomlinson, Jr. | 364/513 |
| 4,921,647 | 3/1990 | Wood | 364/513 |
| 4,933,872 | 1/1990 | Vandenberg et al. | 382/14 |
| 4,951,239 | 11/1990 | Andes et al. | 364/513 |

OTHER PUBLICATIONS

Philip D. Wasserman, "Neural Computing—Theory & Practice", 1989, pp. 128–129.
N. J. Nilsson, The Mathematical Foundations of Learning Machines (© 1990: Morgan Kaufmann Publishers; San Mateo, Calif.) and particularly section 2.6 "The Threshold Logic Unit (TLU)", on pp. 21–23 and Chapter 6 Layered Machines on pp. 95–114.
G. L. Martin et al., "Recognizing Hand-Printed Letters and Digits Using Backpropagation Learning", Technical Report of the MCC, Human Interface Laboratory, Austin, Tex., Jan. 1990, pp. 1–9.

(List continued on next page.)

Primary Examiner—Leo H. Boudreau
Assistant Examiner—Rohini Khanna
Attorney, Agent, or Firm—Dennis R. Arndt

[57] ABSTRACT

Apparatus, and an accompanying method, for a neural network, particularly one suited for use in optical character recognition (OCR) systems, which through controlling back propagation and adjustment of neural weight and bias values through an output confidence measure, smoothly, rapidly and accurately adapts its response to actual changing input data (characters). Specifically, the results of appropriate actual unknown input characters, which have been recognized with an output confidence measure that lies within a pre-defined range, are used to adaptively re-train the network during pattern recognition. By limiting the maximum value of the output confidence measure at which this re-training will occur, the network re-trains itself only when the input characters have changed by a sufficient margin from initial training data such that this re-training is likely to produce a subsequent noticeable increase in the recognition accuracy provided by the network. Output confidence is measured as a ratio between the highest and next highest values produced by output neurons in the network. By broadening the entire base of training data to include actual dynamically changing input characters, the inventive neural network provides more robust performance than which heretofore occurs in neural networks known in the art.

36 Claims, 9 Drawing Sheets

OTHER PUBLICATIONS

J. S. N. Jean et al., "Input Representation and Output Voting Considerations for Handwritten Numeral Recognition with Backpropagation", International Joint Conference on Neural Networks, Washington, D.C., Jan. 1990, pp. I-408 to I-411.

X. Zhu et al., "Feature Detector and Application to Handwritten Character Recognition", International Joint Conference on Neural Networks, Washington, D.C., Jan. 1990, pp. II-457 to II-460.

K. Haruki et al., "Pattern Recognition of Handwritten Phonetic Japanese Alphabet Characters", International Joint Conference on Neural Networks, Washington, D.C., Jan. 1990, pp. II-515 to II-518.

R. K. Miller, Neural Networks (© 1989: Fairmont Press; Lilburn, Ga.), pp. 2-12 and Chapter 4 "Implementation of Neural Networks", on pp. 4-1 to 4-26.

Y. Hayashi et al., "Alphanumeric Character Recognition Using a Connectionist Model with the Pocket Algorithm", Proceedings of the International Joint Conference on Neural Networks, Washington, D.C. Jun. 18-22, 1989, vol. 2, pp. 606-613.

M. Caudill, "Neural Networks Primer—Part III", AI Expert, Jun. 1988, pp. 53-59.

D. J. Burr, "A Neural Network Digit Recognizer", Proceedings of the 1986 IEEE International Conference of Systems, Man and Cybernetics, Atlanta, Ga., pp. 1621-1625.

D. E. Rumelhart, et al., Parallel Distributed Processing, (© 1986: MIT Press; Cambridge, Mass.), and specifically Chapter 8 thereof "Learning Internal Representations by Error Propagation", pp. 318-362.

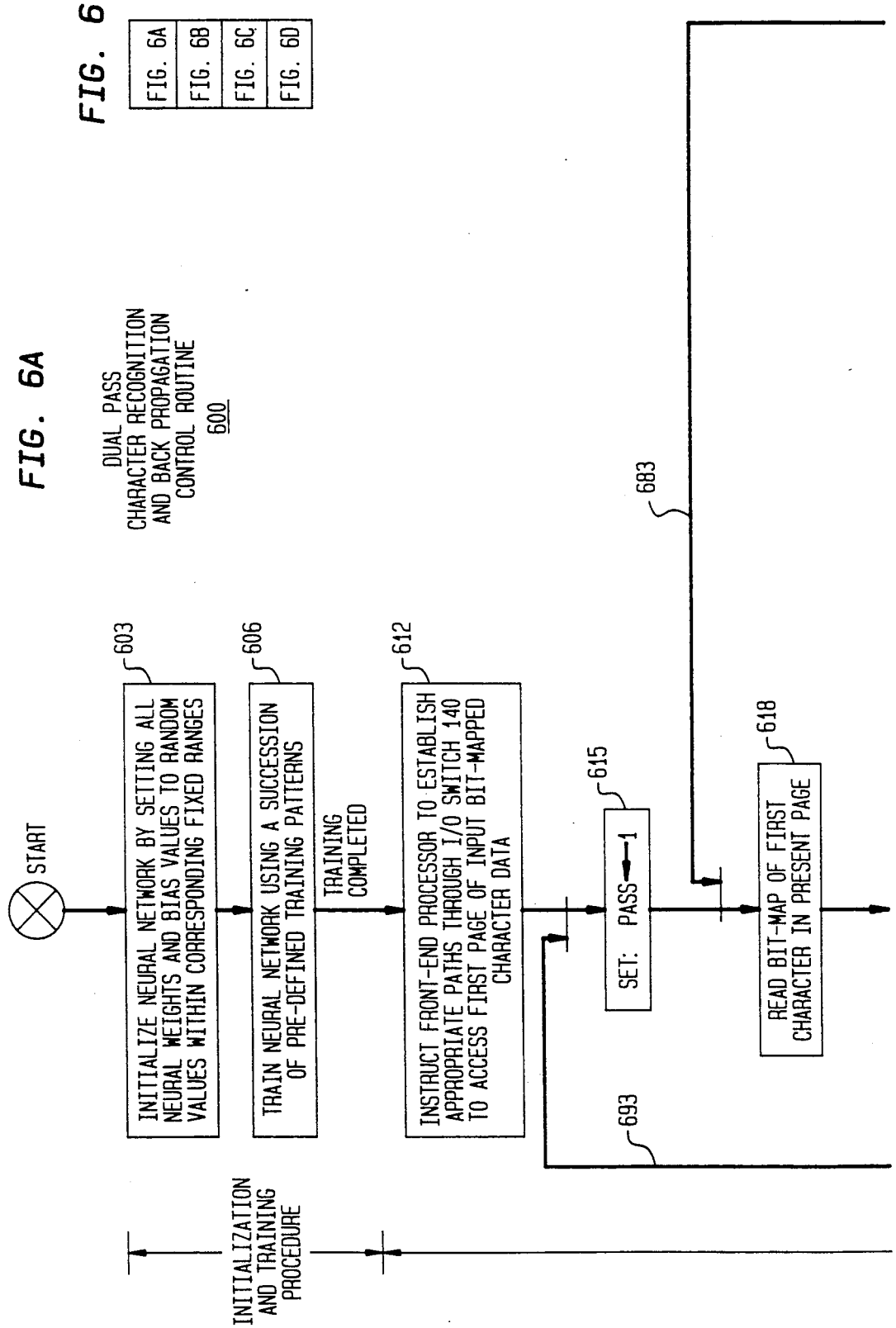

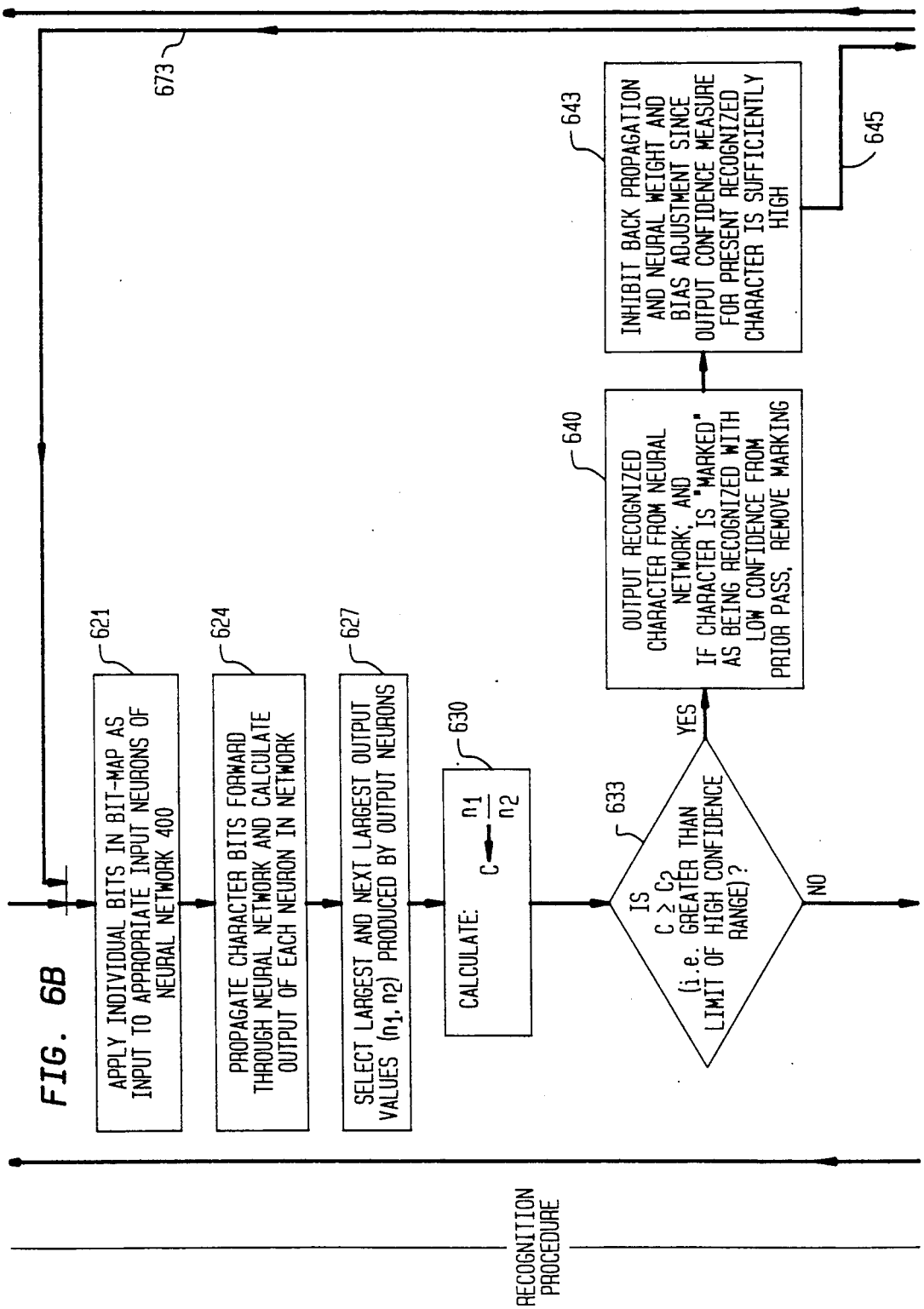

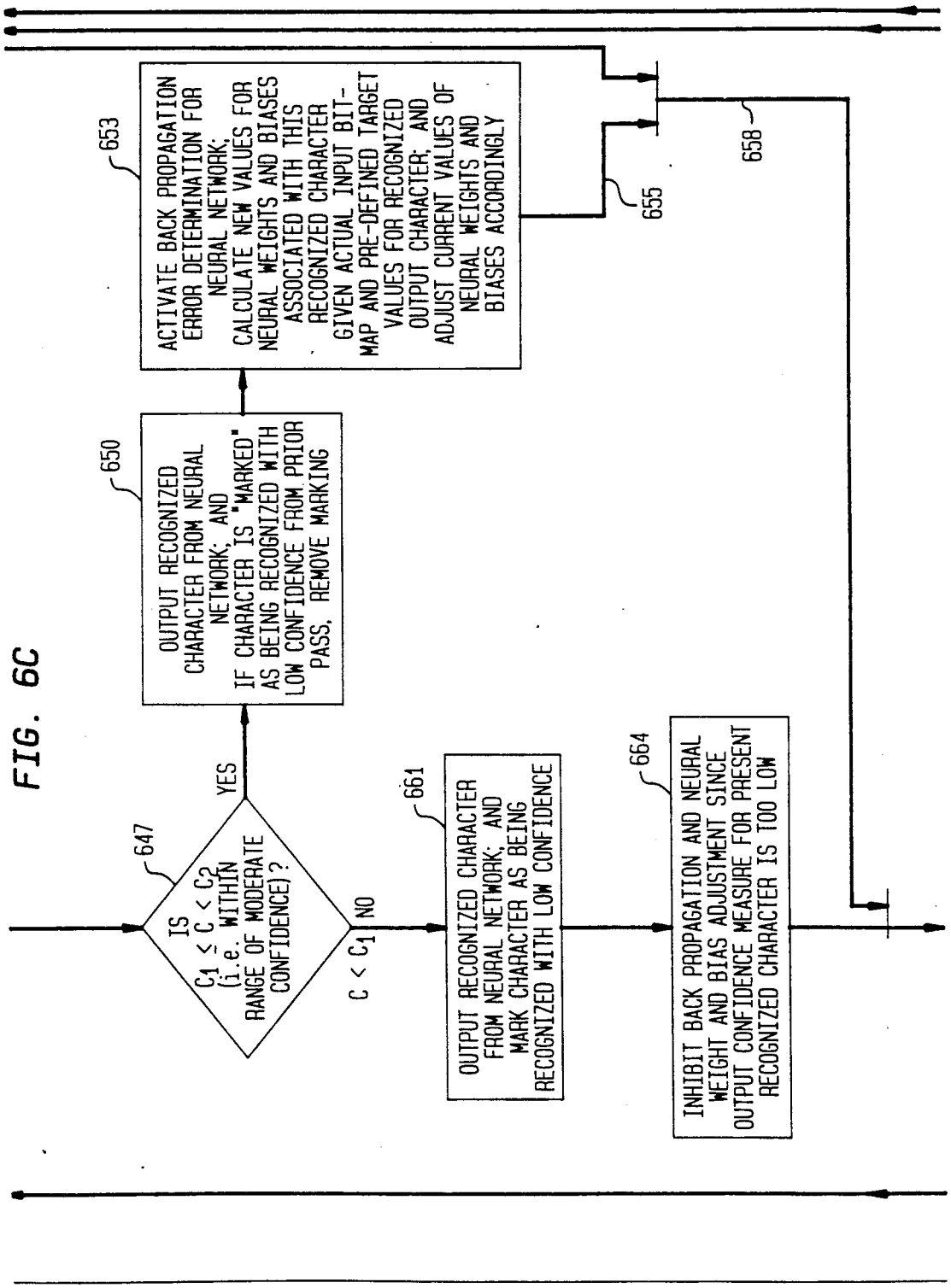

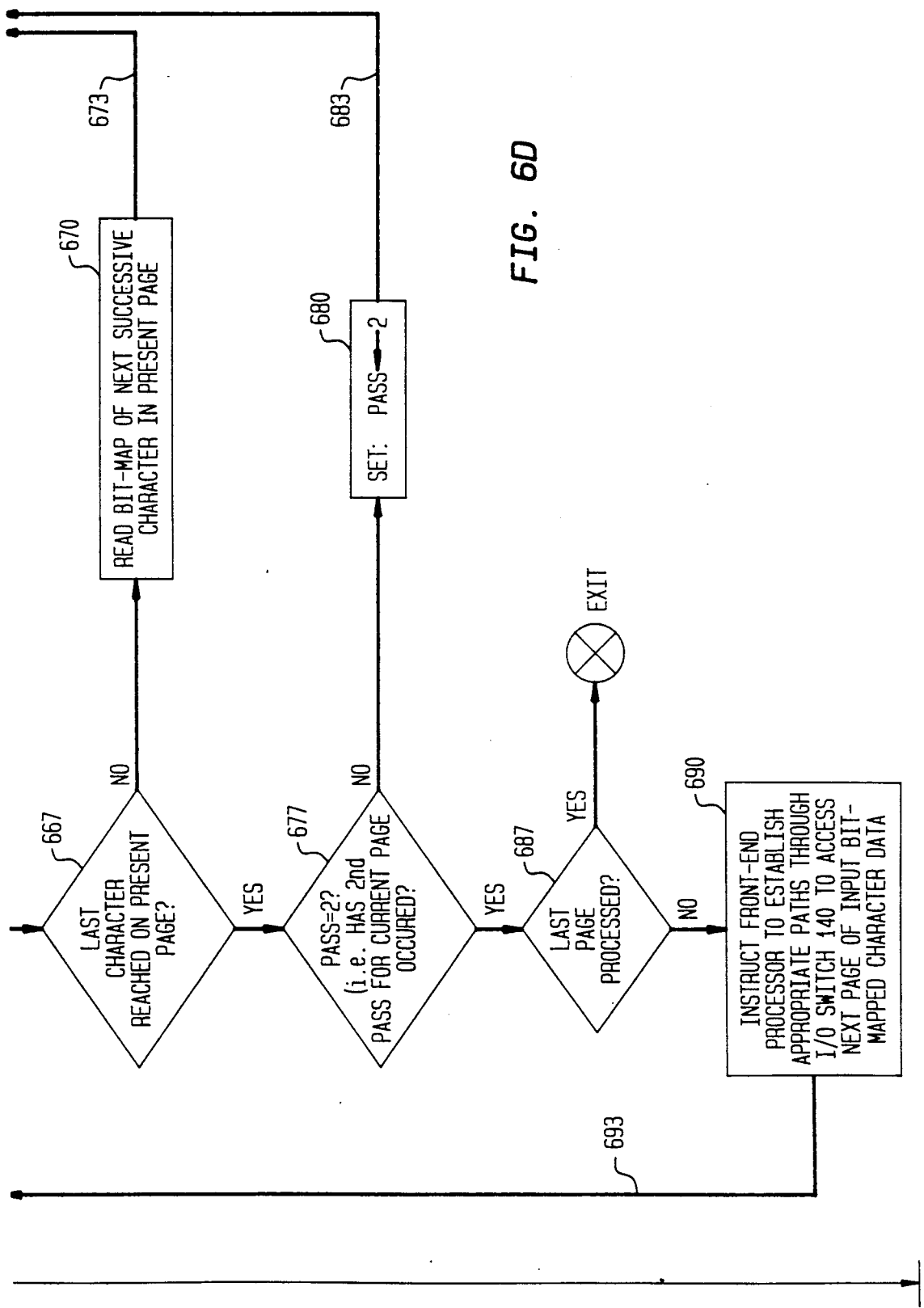

NEURAL NETWORK WITH BACK PROPAGATION CONTROLLED THROUGH AN OUTPUT CONFIDENCE MEASURE

TECHNICAL FIELD OF THE INVENTION

The invention relates to apparatus, and an accompanying method, for a neural network, particularly one suited for use in optical character recognition (OCR) systems, which, by controlling back propagation and adjustment of neural weights and bias values through an output confidence measure, smoothly, rapidly and accurately adapts its response to actual changing input data thereby providing more robust performance than that which heretofore occurs in neural networks known in the art.

BACKGROUND ART

Through the use of word processors and/or other data processing and computerized office equipment, the number of paper documents, particularly forms, of one kind or another that are currently in use has simply exploded over the past few decades. At some point, the information on most of these documents must be extracted therefrom and processed in some fashion.

For example, one document that is in wide use today is a paper bank check. A payor typically fills in, either by hand or through machine, a dollar amount on an appropriate line of the check and presents the check to its recipient. The recipient deposits the check in its bank. In order for this bank to process the check for payment, a human operator employed by the bank reads the amount on the check and instructs a printer to place appropriate digits on the bottom of the check. These digits and similar electronic routing codes situated on the bottom of the check are subsequently machine read to initiate an electronic funds transfer through a banking clearinghouse from the payor's account at its bank (i.e. the paying bank) to the recipient's account at its bank (the presenting bank) and to physically route the check back through the clearinghouse from the presenting bank to the payor bank for cancellation. Inasmuch as the number of checks has been and continues to substantially increase over the past few years, the cost to banks of processing paper checks has been steadily increasing. In an effort to arrest these cost increases or at least temper their rise, banks continually attempt to bring increasing levels of machine automation to the task of processing checks. Specifically, various individuals in banking believe that if the check encoding process were automated by replacing human operators with appropriate optical character recognition (OCR) systems, then the throughput of encoded checks and encoding accuracy will both substantially increase while significant concomitant cost savings will occur. As envisioned, such systems would scan the writing or printing that appears on each check, accurately translate a scanned dollar amount into digital signals, such as appropriate ASCII words, and, inter alia, operate a printer to print appropriate numeric characters onto the bottom of each check in order to encode it.

With the ever expanding amount of paper documents in use in present day society—of which paper checks represent only one illustrative example, the human resources needed to read these documents and convert their contents into machine readable form or directly into computer data are simply becoming either unavailable or too costly to use. As such, a substantial need exists, across many fields, to develop and use OCR systems to accurately automate the process of recognizing and translating first machine printed alphanumeric characters and ultimately handwritten characters into appropriate digital data.

One technique that holds great promise for providing accurate recognition of machine printed characters in an OCR system is the use of a neural network. In contrast to traditional sequential "Von Neumann" digital processors that operate with mathematical precision, neural networks are analog and generally provide massively parallel processing. These networks provide fast and often surprisingly good output approximations, but not precise results, by making weighted decisions on the basis of fuzzy, incomplete and/or frequently contradictory input data.

Basically, a neural network is a configuration of identical processing elements, so-called neurons, that are arranged in a multi-layered hierarchical configuration. Each neuron can have one or more inputs, but only one output. Each input is weighted by a coefficient. The output of a neuron is typically calculated as a function of the sum of its weighted inputs and a bias value. This function, the so-called activation function, is typically a sigmoid function; i.e. it is S-shaped, monotonically increasing and asymptotically approaches fixed values typically $+1$, and zero or $-1$ as its input respectively approaches positive or negative infinity. The sigmoid function and the individual neural weight and bias values determine the response or "excitability" of the neuron to signals presented to all its inputs. The output of a neuron in one layer is often distributed as input to all neurons in a higher layer. A typical neural network contains three distinct layers: an input layer situated at the bottom of the network, an output layer situated at the top of the network and a hidden layer located intermediate between the input and output layers. For example, if a neural network were to be used for recognizing normalized alphanumeric characters situated within a 7-by-5 pixel array, then the output of a sensor for each pixel in that array, such as a cell of an appropriate charge coupled device (CCD), is routed as input to a different neuron in the input layer. Thirty-five different neurons, one for each different pixel, would exist in this layer. Each neuron in this layer has only one input. The outputs of all of 35 neurons in the layer are distributed, in turn, as input to each of the neurons in an intermediate or so-called hidden layer. The output of each of the neurons in the hidden layer is distributed as an input to every neuron in the output layer. The number of neurons in the output layer typically equals the number of different characters that the network is to recognize. For example, one output neuron may be associated with the letter "A", another with the letter "B", a third with the letter "a", a fourth with the letter "b" and so on for each different alphanumeric character, including letters, numbers, punctuation marks and/or other desired symbols, if any, that is to be recognized by the network. The number of neurons in the hidden layer depends, inter alia, upon the complexity of the character bit-maps to be presented to the network for recognition; the desired information capacity of the network; the degree to which the network, once trained, is able to handle unfamiliar patterns; and the number of iterations, as discussed below, that the network must undergo during training in order for all the network weight and bias values to properly converge. The output of the network typically feeds a processor or other circuitry that converts the network output into appropriate multi-bit digital, e.g. ASCII, words for subsequent processing.

The use of a neural network generally involves two distinct successive procedures: initialization and training on known pre-defined patterns having known outputs, followed by recognition of actual unknown patterns.

First, to initialize the network, the weights and biases of all the neurons situated therein are set to random values typically within certain fixed bounds. Thereafter, the network is trained. Specifically, the network is successively presented with pre-defined input data patterns, i.e. so-called training patterns. The values of the neural weights and biases in the network are simultaneously adjusted such that the output of the network for each individual training pattern approximately matches a desired corresponding network output (target vector) for that pattern. Once training is complete, all the weights and biases are then fixed at their current values. Thereafter, the network can be used to recognize unknown patterns. During pattern recognition, unknown patterns are successively applied in parallel to the inputs of the network and resulting corresponding network responses are taken from the output nodes. Ideally speaking, once the network recognizes an unknown input pattern to be a given character on which the network was trained, then the signal produced by a neuron in the output layer and associated with that character should sharply increase relative to the signals produced by all the other neurons in the output layer.

One technique commonly used in the art for quickly adjusting the values of the weights and biases of all the neurons during training is back error propagation (hereinafter referred to simply as "back propagation"). Briefly, this technique involves presenting a pre-defined input training pattern (input vector) to the network and allowing that pattern to be propagated forward through the network in order to produce a corresponding output pattern (output vector, O) at the output neurons. The error associated therewith is determined and then back propagated through the network to apportion this error to individual neurons in the network. Thereafter, the weights and bias for each neuron are adjusted in a direction and by an amount that minimizes the total network error for this input pattern.

Once all the network weights have been adjusted for one training pattern, the next training pattern is presented to the network and the error determination and weight adjusting process iteratively repeats, and so on for each successive training pattern. Typically, once the total network error for each of these patterns reaches a pre-defined limit, these iterations stop and training halts. At this point, all the network weight and bias values are fixed at their then current values. Thereafter, character recognition on unknown input data can occur at a relatively high speed. In this regard, see, e.g. M. Caudill, "Neural Networks Primer—Part III", *AI Expert*, June 1988, pages 53–59.

During character recognition, a "winner take all" approach is generally used to identify the specific character that has been recognized by the network. Under this approach, once the network has fully reacted to an input data pattern, then the one output neuron that generates the highest output value relative to those produced by the other output neurons is selected, by a processing circuit connected to the network, as the network output. Having made this selection, the processor then determines, such as through a simple table look-up operation, the multi-bit digital representation of the specific character identified by the network.

Back propagation type neural networks of the type thusfar described have yielded highly accurate results in recognizing alphanumeric characters in a laboratory environment from a static universe of test data. However, when such networks have been incorporated into OCR systems and used for character recognition in the field (i.e. a "real world environment"), serious problems have arisen which significantly limit the recognition accuracy that has been obtained thereby.

Specifically, in a factory where an OCR system is manufactured, a set of printers exist and are typically used to generate alphanumeric characters in a wide variety of different fonts. The neural network in the OCR system is trained at the factory to recognize these specific characters. Unfortunately, once the OCR system leaves the domain of the factory and is operated at a customer location, the system will encounter a variety of new characters on which it has not trained. These new characters can illustratively arise because the customer is using a different font than any of those used to train the neural net and/or through physical differences existing between the specific typeface in a given font used to train the net and the actual typeface for the same font that appears in documents being scanned at the customer location. Physical differences can arise between the typefaces produced by two printers that use the same font due to a number of factors, such as differential wear between corresponding printing elements in these printers which can cause differences in the impressions or depictions made thereby on a print media, differing degrees of dirt or grit in the corresponding elements, non-uniformities in the ink or toner applied by the corresponding elements to the media as well as through slight visible differences, such as differing lengths of ascenders, descenders and serifs, in the corresponding characters themselves that have been implemented in the same font in these printers. Hence, owing, inter alia, to the illustrative factors described above, an OCR system situated at a customer location will likely be exposed to a dynamically changing universe of alphanumeric characters. As the OCR system experiences each new character, the neural network may well misrecognize the character and, by doing so, generate a recognition error.

To reduce the occurrence of recognition errors that occur in the field to an acceptably low level, an OCR system operator is required to periodically train the system to the specific characters which the system is then expected to recognize. Inasmuch as the fonts themselves as well as the typeface for a common font used in several successive documents can even change from one document to the next, the system may well need to be trained on each different document. Unfortunately, continually training the system, particularly for each successive document to be recognized, consumes a significant amount of time and, as such, greatly reduces overall system throughput.

Furthermore, customer documents frequently contain corrupted characters. This corruption arises due to, inter alia, printing errors, dirt or local imperfections in the print media itself (e.g. paper inclusions that appears as a localized dark spot) that commonly occurs under field conditions. Unfortunately, this corruption, when it occurs in an input character on which the network was supposedly trained, often causes a neural network to be unable to positively recognize that character. As a result, for this character, the network will likely produce an output vector in which the difference between the maximum value and the next lowest value contained therein is rather small. In this instance, the network is producing an ambiguous result; the output vector contains a high degree of uncertainty with relatively little confidence in its maximum output value. Due to the ambiguity, the correctly recognized character may not be that associated with the output neuron having the maximum value but rather that having the next lowest value. This ambiguity is simply ignored through an output selection process predicated on a "winner take all" approach. Accordingly, in this instance, the selected output from the network will be wrong.

Hence, if the network were to be trained in the field using customer documents that contained corrupted characters, the resulting uncertainty arising in the output of the network would then skew the network to recognize corrupted characters. This skew in conjunction with a "winner take all" output selection process would likely disadvantageously increase, rather than decrease, the recognition errors that would occur during recognition of non-corrupted input characters appearing on these customer documents and therefore increase the overall recognition error rate.

Rather than allowing the overall recognition error rate to disadvantageously rise during field use, the network weights and biases are usually fixed at the factory with limited, if any, variation therein being permitted in the field. Though the overall recognition error rate of the OCR system would likely rise, from its rate occurring in the factory, during recognition of customer documents that contain corrupted characters, this rise is likely to be less than that which would otherwise occur if the network were to be trained to recognize these corrupted characters. As such, in providing what is believed to be reasonable performance, manufacturers of OCR systems have implicitly required their customers to accept a certain increased level of recognition errors during field use of an OCR system. Unfortunately, in many applications where accurate automated recognition of machine printed characters is essential, this level is still unacceptably high. Accordingly, currently available OCR systems are simply unsuitable for use in these applications.

Of course, one solution would be to employ a human operator at the OCR system during character recognition. The OCR system would flag to the operator each character that it either mis-recognized or recognized with a certain high degree of uncertainty. The operator would then examine the bit map of each such character and then supply the correct character to the system. Though the resulting overall accuracy of the OCR system would then increase, incorporating a human operator into the system would unfortunately reduce the throughput of the system dramatically and add significant cost to its operation. Since many applications of OCR systems are highly cost sensitive, incorporating a human operator into the system is simply economically infeasible.

Therefore, a specific need exists in the art for a neural network, particularly one using back propagation and suitable for use in an OCR system, that can accurately adapt its performance to dynamically changing "real world" customer input data. Such a network would provide more robust performance with greater recognition accuracy, particularly when confronted with dynamically changing input character data, than that heretofore occurring through use of neural networks known in the art. Moreover, such a network might well provide sufficiently high recognition accuracy to at least significantly reduce, if not in many instances totally eliminate, the need to incorporate a human operator into the OCR system. As such, use of such a network in an OCR system would not only increase the overall recognition accuracy but also advantageously increase the throughput of the OCR system without significantly increasing its cost. This, in turn, would permit OCR systems to be used in many applications for which they were heretofore unsuitable.

DISCLOSURE OF THE INVENTION

Accordingly, it is an object of the present invention to provide a neural network that can accurately adapt its performance to dynamically changing input data.

A specific object is to provide such a neural network that utilizes back propagation to change network weights and biases during training.

A specific object is to provide such a neural network that will not significantly increase the cost of an OCR system that utilizes this network.

These and other objects are accomplished in accordance with the teachings of my present invention by: a network, responsive to unknown input data, for producing a plurality of output values that collectively identifies one of the patterns existing in unknown input data, the network having a plurality of numeric weights associated therewith; means, responsive to a control signal and to the plurality of output values and pre-defined output target values associated therewith for the one pattern, for determining changes in the value of each of the numeric weights and, in response thereto, for adjusting a value of each of the weights while the unknown input data is applied to the network so as reduce error arising between the output values and the output target values for the unknown input data; means, responsive to the plurality of output values, for determining a confidence measure associated therewith; and means, responsive to the confidence measure, for generating the control signal so as to enable the determining and adjusting means to determine the changes and adjust the values of the weights whenever the confidence measure has a sufficient pre-defined numeric value. As such, the network is trained to recognize the pattern in the event the pattern deviates from a pre-defined pattern.

Through my invention, the base of data on which a neural network can be trained is expanded to include the results of actual unknown input characters that have been recognized with a sufficient output confidence. Output confidence is illustratively measured as a ratio between the highest and next highest values produced by output neurons in the network. During character recognition, back propagation and adjustment of neural weight and bias values are permitted to occur in response to the network outputs for those characters recognized with a output confidence measure that lies within a pre-defined range. Any character recognized with an output confidence in this range likely indicates that: (a) the bit-map for this character has changed somewhat from the bit-map for the same character on which the network was initially trained, and (b) in spite of this change in the bit-map, the network probably correctly recognized this character. By re-training the network on these characters, the network accurately and automatically adapts itself to recognize the actual changing "real world" characters it is then encountering during field use rather than remaining frozen on only those characters to which it was initially trained—either in a factory or elsewhere. Consequently, by expanding the entire base of network training data in this manner to include dynamically changing input characters recognized with a sufficient output confidence, my inventive neural network smoothly, rapidly and accurately adapts its response to "real world" characters, thereby providing more robust performance than that heretofore occurring in neural networks known in the art. Advantageously, the additional recognition accuracy provided through use of my invention may, in many situations, be sufficient to substantially, if not totally, eliminate the need to have a human operator examine the bit map of each mis-recognized character and then supply the correct character to the system.

In accordance with the teachings of a preferred embodiment of my invention, back propagation and adjustment of neural weight and bias values are not permitted to occur in response to the output of the network for any input character that has been recognized with insufficiently low or excessively high output confidence. An insufficiently low output confidence measure indicates that excessive uncertainty exists in the recognized character; while an excessively high output confidence measure indicates that the bit-map for the recognized character has not changed sufficiently, if at all, to warrant network re-training and any such re-training, if it were to occur, would not be likely to noticeably improve, if at all, the recognition accuracy provided by the network.

Furthermore, in accordance with a feature of my present invention, the recognition accuracy provided by my inventive system, though better than that obtainable through neural networks known in the art, can be enhanced even further using a "two-pass" operation. This operation would be preferred for use with those document(s) for which an extremely high recognition accuracy is desired. Here, during a "first pass" each page of such a document would be processed through my inventive neural network with adaptive network re-training for any character appearing on that page being governed by the confidence with which the network recognizes that character. Once that page has been fully processed by my network, the same page would be sent through the network again and processed in the same manner thereby undergoing a "second pass" through the network. In this manner, various characters that might have been mis-recognized during the first pass may well be properly recognized during the second pass thereby increasing the recognition accuracy for that page.

BRIEF DESCRIPTION OF THE DRAWINGS

The teachings of the present invention may be readily understood by considering the following detailed description in conjunction with the accompanying drawings, in which:

FIG. 6 shows the correct alignment of the drawing sheets for FIGS. 6A–6D; and

FIGS. 6A–6D collectively depict a high level flowchart for Dual Pass Character Recognition and Back Propagation Control Routine 600 which implements my inventive character recognition process in software and utilizing a software embodiment of my inventive neural network shown in FIG. 4.

To facilitate understanding, identical reference numerals have been used, where possible, to denote identical elements that are common to various figures.

MODES OF CARRYING OUT THE INVENTION

After reading the following description, those skilled in the art will readily appreciate that my inventive neural network can be used in a wide variety of applications for pattern recognition. One such illustrative application involves optical character readers for recognizing alphanumeric characters. Illustratively, these characters can be printed or handwritten on any print media, e.g. paper or microfilm, or even handwritten on a digitizing tablet or through a light-pen on a cathode ray tube (CRT) display. Nevertheless, since my inventive network is particularly suited for use in the context of a optical character recognition system for recognizing normalized machine printed characters appearing on paper documents and also to simplify the following discussion, I will now discuss my invention in this illustrative context.

Figure 1:
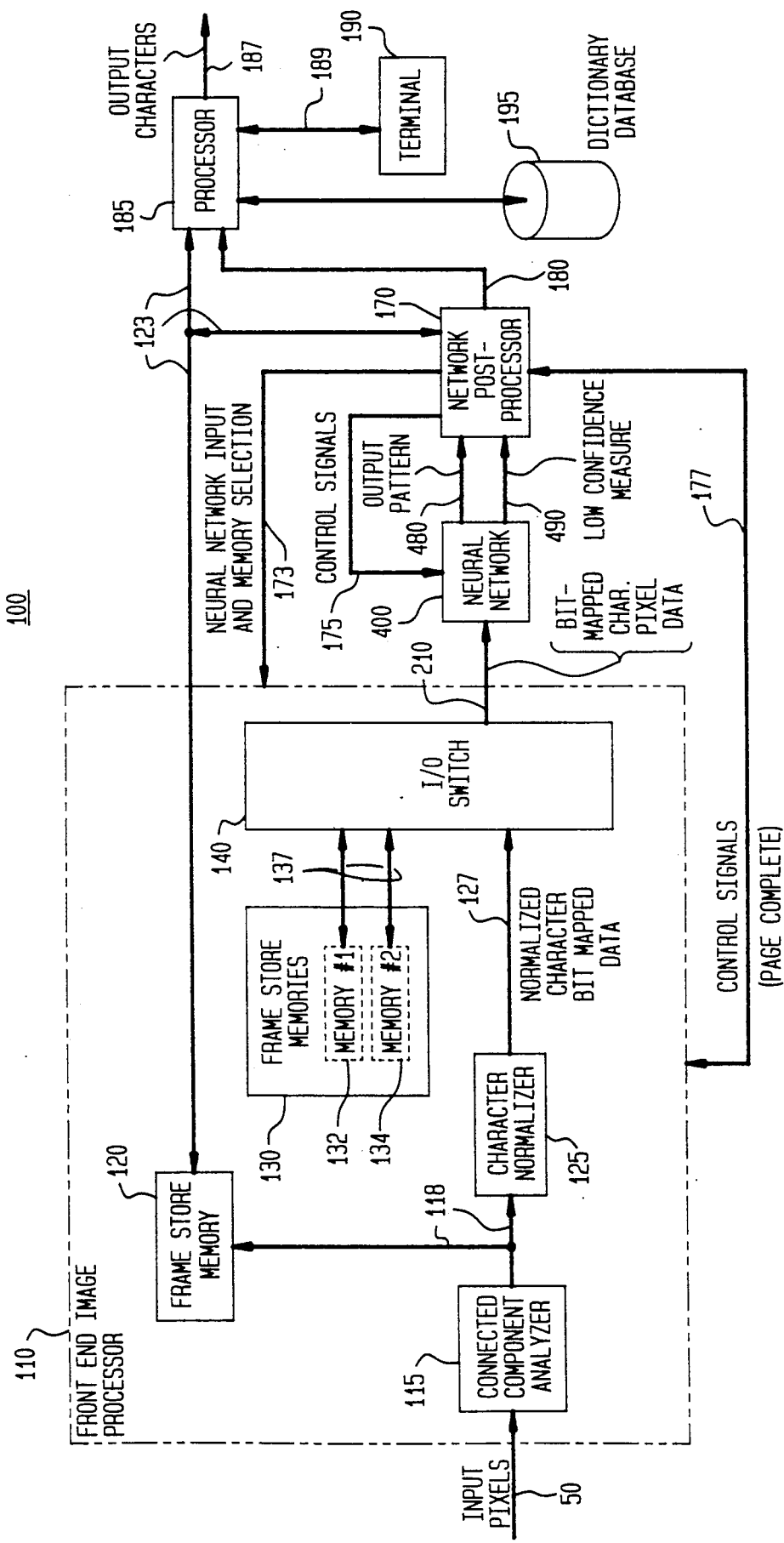
FIG. 1 depicts a block diagram of an embodiment of an optical character recognition (OCR) system that contains a neural network that embodies the teachings of the present invention.

A block diagram of an embodiment of an optical character recognition (OCR) system for recognizing machine printed characters and which contains a neural network embodying the teachings of the present invention is depicted in FIG. 1. As shown, this system consists of front-end processor 110, neural network 400, network post-processor 170; and optionally processor 185, terminal 190 and hard disk file 195.

Incoming image pixels from an image document undergoing recognition, generated by an appropriate scanner and applied through appropriate interface circuitry (both of which are well-known and not shown), are applied through lead 50 to an input of front-end processor 110. This processor separates each individual character from those existing in the document, even if these characters are kerned, normalizes the bit-map pattern for each character to a uniform size compatible with the input of neural network 400, stores both the non-normalized and normalized characters within frame store memories 120 and 130, respectively, and applies a sequence of normalized image pixels from frame store memories 130 through input/output (I/O) switch 140 to neural network 400. Specifically, connected component analyzer 115 located within front-end processor 110 receives a stream of incoming image pixels on lead 50. By performing connected component analysis, analyzer 115 separates the image of adjacent characters in the document from one another. Each individual separated character is then supplied by analyzer 115, via leads 118, as input to both frame store memory 120 and character normalizer 125. Frame store memory 120 merely stores the non-normalized bit-map pattern for each separated character that occurs in the current page of the input document. These non-normalized patterns, in turn and as discussed below, will be used by network post-processor 170 in determining the case (upper or lower) of those characters which, once normalized, possess the same shape regardless of their case. Character normalizer 125 determines the horizontal and vertical dimensions of the bit-map for each separated character. In the event that these dimensions for any such character are either greater or less than the uniform character dimensions required by neural network 400, e.g. 24 pixels vertically by 12 pixels horizontally, normalizer 125 proportionally changes the size of the bit-map of this character to match the uniform size. The bit-map of each resulting normalized character is applied, via lead 127, to an input of I/O switch 140.

Inasmuch as a preferred embodiment of my invention utilizes a two pass approach through the neural network, as described in detail below, to achieve high recognition accuracy through adaptive dynamic training, frame store memories 130 store a bit-map of every normalized character contained in an entire document page currently being recognized for use during a second pass through the network. By storing these bit-maps, use of frame store memories 130 obviates the need to scan each document page twice as well as the need to perform character separation and normalization twice for each scanned character. Frame store memories 130 contain two separate frame store memories 132 and 134. Each of these memories holds a complete page of normalized bit-mapped characters. These memories are operated, under the control of I/O switch 140, in a well-known "ping-pong" fashion such that one frame store memory, i.e. memory 132 or 134, is being filled, via leads 137, with normalized bit-map data produced by normalizer 125 while the other frame store memory is being emptied, via leads 137 and through switch 140, into the input of neural network 400. Through appropriate control signals generated within front-end processor 110 and in response to control signals received over leads 177 from network post-processor 170, I/O switch 140 establishes appropriate multi-bit paths (not explicitly shown) between the individual frame store memories within frame store memories 130, the output of character normalizer 125 and/or the input to neural network 400. If a page of normalized bit-mapped character data is to be processed via a first pass through the network, then I/O switch 140 applies the output of normalizer 125 to both an input of either frame store memory 132 or 134, depending upon which memory is currently empty, and to the input of neural network 400. Therefore, as each successive normalized bit-mapped character pattern is being processed through the neural network, the same pattern is being stored within one of the frame store memories within memories 130 for subsequent use during the next, i.e. second, pass. During the second pass, the contents of this particular frame store memory situated within memories 130 are successively read out through I/O switch 140 and applied to the input of neural network 400. Simultaneously, character normalizer 125 applies normalized bit-mapped character data, through I/O switch 140 for the next successive input document page for storage into the other frame store memory situated within memories 130, and so on. Inasmuch as frame store memories 130 and I/O switch 140 jointly eliminate the need to scan each page twice as well as the concomitant need to perform character separation and normalization twice, the throughput of front-end processor 110, which is typically less than that of neural network 400 and post-processor 170, is not adversely affected even though each page of bit-mapped normalized characters is processed through the neural network in two successive passes. Inasmuch as the present invention concerns neural network 400 incorporated within OCR system 100 and is not directed to the functioning of either connected component analyzer 115 or character normalizer 125, the operation of these two components will not be explained in any further detail. However, to obtain such an explanation, the reader is referred to my co-pending United States patent application entitled "Optical Character Recognition Neural Network System for Machine-Printed Characters", Ser. No. 07/474,587, filed Feb. 2, 1990, which is incorporated by reference herein.

Neural network 400 performs pattern recognition of each normalized bit-mapped character appearing on leads 210. Specifically, each bit of the normalized character is applied to a different input lead to the network. Basically, neural network 400, which will be described in detail shortly, is a configuration of identical processing elements, so-called neurons, that are arranged in a multi-layered hierarchical configuration with separate input, hidden and output neural layers. Inasmuch as each normalized character bit-map is formed of a uniform array of 24-by-12 pixels for a total of 288 pixels, neural network 400 contains 288 input neurons with each neuron in the input layer being fed by a different pixel in this bit-map. Neural network 400 illustratively contains approximately 75 hidden units, though this number is not critical. The number of outputs from network 400, specifically output neurons, as described below, and corresponding leads in output leads 480, equals the number of different characters that this network is to recognize. Neural network 400 contains approximately 50 different output neurons, each producing an output value. One output neuron and a corresponding lead in leads 480 is associated with the letter "A", another output neuron and a corresponding lead with the letter "B", a third with the letter "a", a fourth with the letter "b" and so on for each different alphanumeric character, including letters, numbers, punctuation marks and/or other desired symbols (hereinafter all collectively referred to as "characters") that network 400 is to recognize. All the output values produced of the network feed network post-processor 170 which, in response to these values, converts the network output into appropriate multi-bit digital, e.g. ASCII, words for subsequent processing. Neural network 400 is preferably implemented in software using an integrated digital signal processing circuit, such as preferably the model 56000 digital signal processor (DSP) manufactured by Motorola Incorporated of Schaumburg, Ill. Through use of this circuit, neural network 400 should be capable of processing upwards of 200 characters/second.

During character recognition, network 400, in conjunction with post-processor 170, operates using a "winner take all" approach to identify the specific character that has been recognized by the network. Specifically, once network 400 has fully reacted to an normalized character bit-map applied to leads 210, then the one output neuron that generates the highest output value relative to those produced by the other output neurons is selected, by network post-processor 170 which is connected, via leads 480, to the network output. The post-processor compares the values produced by all the output neurons in network 400 and appearing on leads 480 and selects the largest output value. Having made this selection, post-processor 170 then determines, such as through a simple table look-up operation, the multibit digital, e.g, ASCII, representation of the specific character identified by the network and corresponding to the specific output neuron that has the maximum output. Inasmuch as certain normalized bit-map characters, such as the letter "O", have the same shape regardless of their case, i.e. upper or lower case, post-processor 170, upon determining that the network has recognized any such character, accesses the non-normalized bit-map of that character, via leads 123, from frame store memory 120. From the non-normalized bit-map, the post-processor determines the size of the non-normalized character and can thus determine its proper case. A relatively large sized non-normalized character indicates upper case; while a relatively small sized non-normalized character indicates lower case. Given the case of the recognized character, post-processor 170 then provides the proper digital, e.g. ASCII, representation for this character on leads 180. The post-processor also controls the operation of neural network 400 by generating various control signals appearing on leads 175. One of these signals, as described in detail below, controls the training of the network. Post-processor 170 also applies appropriate select signals to front-end processor 110, via leads 173. These signals instruct the front-end processor to either begin re-applying the current page of normalized input character bit-maps to neural network 400 for second pass processing therethrough or to begin applying the next successive page of normalized input character bit-maps in the input document for first pass processing through the network. Furthermore, various well-known control signals, such as, inter alia, "page complete", are communicated over leads 177 between front-end processor 110 and network post-processor 170 in order to coordinate their operation.

The output provided by post-processor 170 is routed over leads 180 to processor 185. In conjunction with a vocabulary database stored on hard disk file 195, processor 185 performs spell check operations on each word formed of characters recognized by neural network 400. Once the letters forming each such word have been generated by network post-processor 170, processor 185 performs a lookup operation into the vocabulary database to discern if the word is spelled correctly. If a mis-spelling is found, processor 185 accesses, via leads 123, the non-normalized character bit-maps from frame store memory 120 for each character in the word and, via lead 189, routes these bit-maps to terminal 190 for visual display thereon. The processor then displays a prompt message on the terminal instructing an operator situated thereat to either confirm the spelling of the word, as is, or enter the correct spelling. If the operator confirms the present spelling as correct, processor 185 merely provides the present characters that form this word on output leads 187. Inasmuch as the word could be mis-spelled on the document itself and properly recognized by neural network 400, processor 185 does not apply any corrections for erroneous characters in this word back to network 400 for training but rather merely provides the correct characters on output leads 187. These spell check operations could occur after the second pass through network 400 has been completed for each successive word on a page currently being recognized or after this entire page has completed its second pass through network 400. Other databases, in lieu of or in addition to a dictionary, could be stored on hard disk file 195 to assist in determining and correcting errors in the documents being recognized. To simplify and reduce the cost of OCR system 100, processor 185, terminal 190 and hard disk file 195 can be eliminated to remove the database, e.g. spell check, operations from the system. In this case, the characters provided over lead 180 by network post-processor 170 would be the output of the OCR system.

Neural network 400, as described in detail below, is trained utilizing a well-known technique of back error propagation (hereinafter referred to as simply "back propagation"). In essence, through this technique, the network is presented with a sequence of successive input bit-maps for known characters. Neural weights and bias values, also as discussed in detail below, are adjusted for each such bit-map such the network produces a correct output for each training character.

Unfortunately, neural networks known in the art which have relied on use of back propagation suffer serious drawbacks that limit their utility in OCR systems. In essence, although such networks yield accurate results in recognizing alphanumeric characters in a laboratory environment from a static universe of test data, the recognition accuracy provided by such a network typically decreases by a significant margin in a field environment using "real world" character data. This arises because the "real world" characters and fonts to which such a network will be exposed in the field will often vary, for a variety of reasons, from the characters and fonts on which the network has been trained in a factory. In addition, typefaces, even for a common font, can and often vary somewhat from one document being recognized to the next.

While neural networks known in the art can be trained for each successive document, such training consumes a significant amount of time and, as such, greatly reduces overall system throughput. Furthermore, due to, inter alia, printing or media imperfections, characters can be corrupted. If a neural network were to train on a corrupted character, the performance of the network would be incorrectly skewed towards recognizing such characters. This skew in conjunction with a "winner take all" output selection process typically provided by a network post-processor would likely disadvantageously increase, rather than decrease, the recognition errors that would occur during recognition of non-corrupted input characters appearing on these customer documents and therefore increase the overall recognition error rate.

Through my inventive neural network, I have substantially eliminated these drawbacks associated with neural networks known in the art. In particular, through my invention, the base of data on which a neural network can be trained is expanded to include the results of actual unknown input character data that have been recognized with a sufficient output confidence Output confidence is measured as a ratio between the highest and next highest values produced by output neurons in the network. During character recognition, back propagation and adjustment of neural weight and bias values are permitted to occur in response to the network outputs for these characters recognized with a output confidence measure that lies within a pre-defined range. Any character recognized with an output confidence in this range likely indicates that: (a) the bit-map for this character has changed somewhat from the bit-map for the same character on which the network was initially trained, and (b) in spite of this change in the bit-map, the network probably correctly recognized this character. However, back propagation and adjustment of neural weight and bias values are not permitted to occur in response to the output of the network for any input character that has been recognized with insufficiently low or excessively high output confidence. An insufficiently low output confidence measure indicates that excessive uncertainty exists in the recognized character; while an excessively high output confidence measure indicates that the bit-map for the recognized character has not changed sufficiently, if at all, to warrant network re-training and any such re-training, if it were to occur, would not be likely to noticeably improve, if at all, the recognition accuracy provided by the network. Consequently, by expanding the entire base of network training data in this manner to include dynamically changing input characters recognized with a sufficient output confidence, my inventive neural network smoothly, rapidly and accurately adapts its response to these changing input characters, thereby providing more robust performance than that heretofore occurring in neural networks known in the art.

With this inventive approach in mind, neural network 400 provides an output confidence measure on lead 490 to network post-processor 170. This output confidence measure is utilized within the network, as described in detail below, to control back propagation and adjustment of neural weight and bias values. Post-processor 170 utilizes this measure to flag those characters in a page of an input document that have been recognized with low output confidence and are thus likely to be re-classified during a second pass through network 400.

In order for OCR system 100 to provide superior recognition accuracy, "two-pass" operation, as described above, is preferred. However, to simplify the system and reduce its cost at the expense of slightly lowered recognition accuracy—though to a level that is still quite better than that associated with neural networks known in the art, "one-pass" operation could be used instead. In this case, each page of an input document would be processed only once through neural network 400. Although this network would adaptively re-train itself on those actual changing input characters on each page that were recognized with a sufficiently high degree of confidence, network 400 would not have an opportunity to re-classify any characters on that page that it might have initially mis-recognized. However, since the entire base of the network training data is nevertheless broadened to include actual changing input characters, recognition accuracy would still markedly improve, over that obtainable using neural networks known in the art, for those input characters that appear in subsequent pages in the same document. To implement "one-pass" operation, frame store memories 130 and I/O switch 140 could be eliminated from system 100 shown in FIG. 1 with the output of character normalizer 125 being applied directly to the input of neural network 400. Alternately, system 100 could switchably provide either one or two pass operation depending upon the degree of recognition accuracy required by a system operator or downstream image and/or word processing equipment (not shown).

Figure 2:
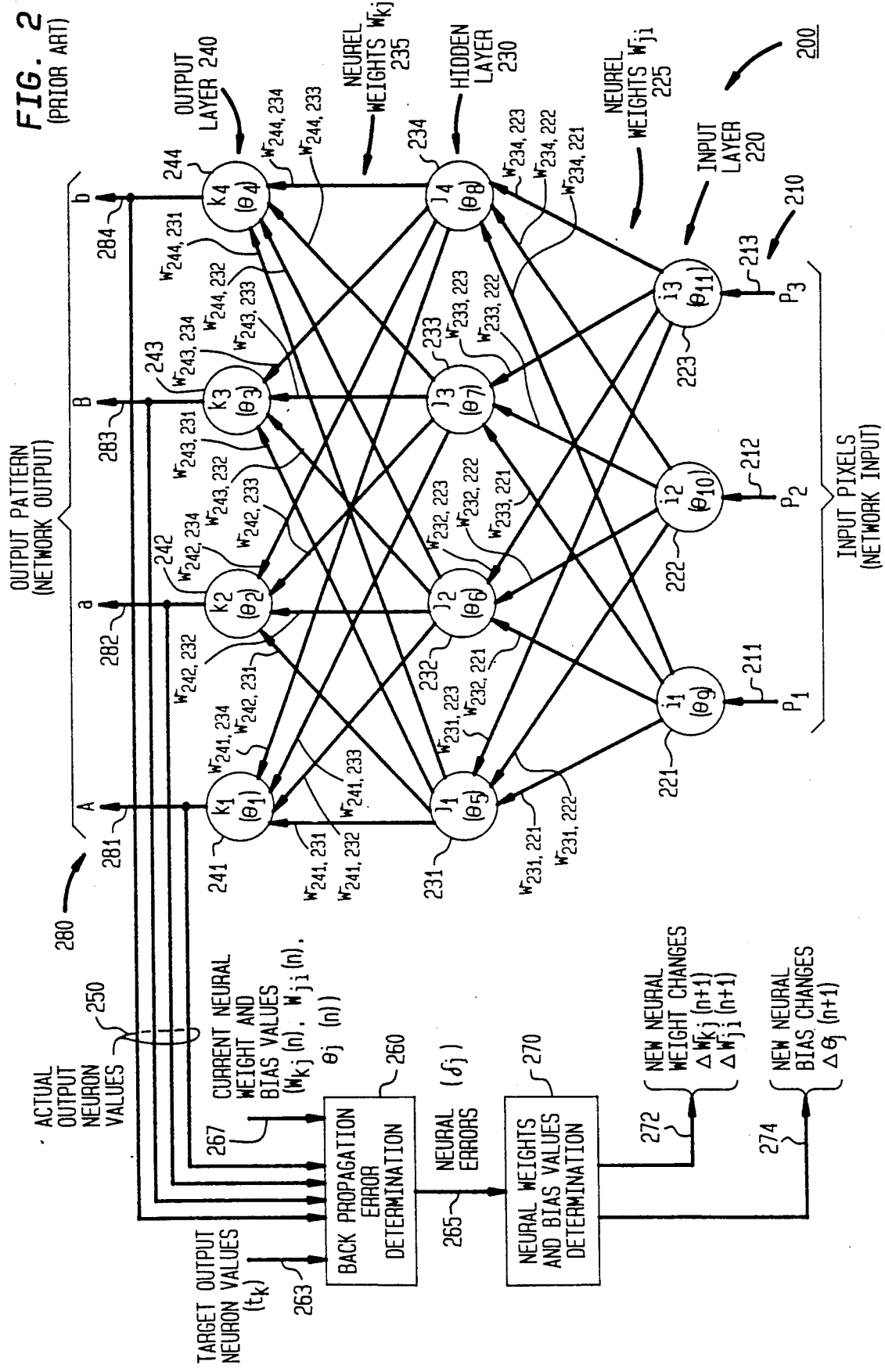
FIG. 2 depicts a block diagram of neural network for use in an OCR system which utilizes back propagation and is typical of that known in the art.
Figure 3:
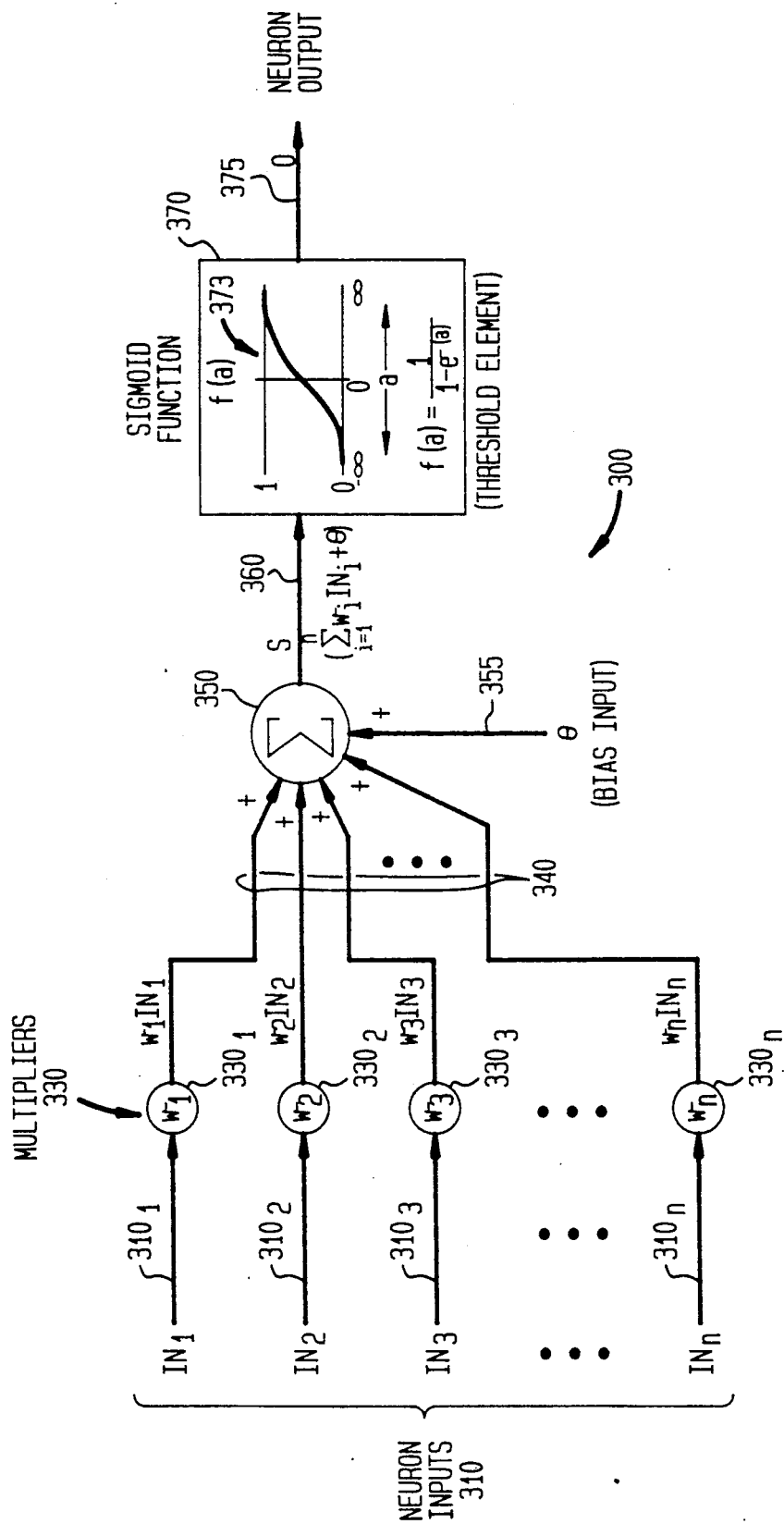
FIG. 3 depicts a high level block diagram of a typical neuron utilized in a neural network.
Figure 4:
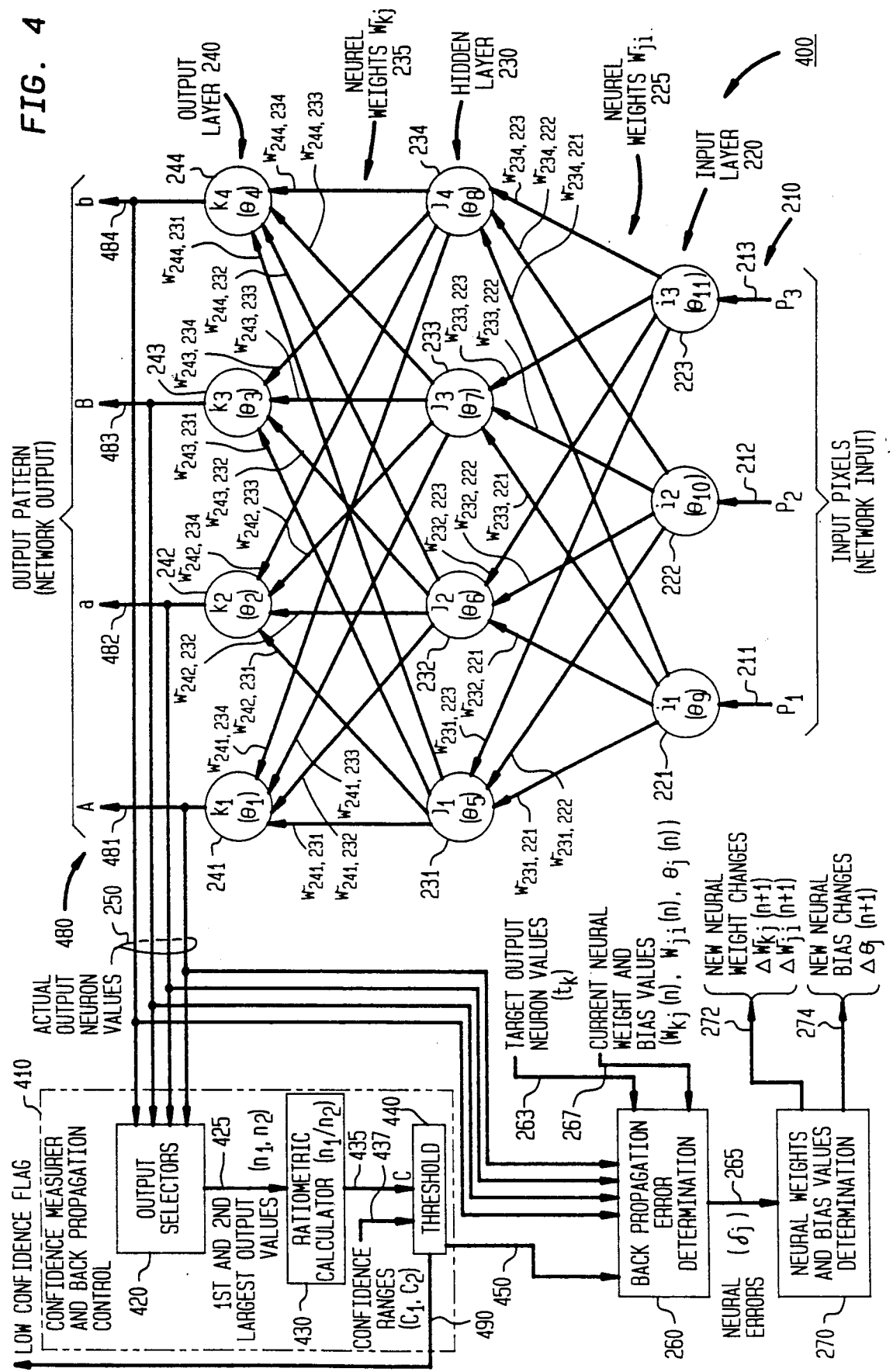
FIG. 4 depicts a high level block diagram of an embodiment of my inventive neural network.

To fully and readily appreciate the teachings of my present invention, I will first discuss the operation of a typical back propagation based neural network known in the art, in conjunction with FIGS. 2 and 3, which can be used in an OCR system and then discuss the modifications, as shown in FIG. 4, to this network and occasioned by use of my invention.

FIG. 2 depicts a block diagram of neural network 200 for use in an OCR system which utilizes back propagation and is typical of neural networks known in the art. As shown, network 200 is composed of a number of identical neurons organized into three hierarchical layers: input layer 220 having neurons 221, 222, and 223; hidden layer 230 having neurons 231, 232, 233 and 234; and output layer 241, 242, 243 and 244. Each of these neurons has the functional structure shown in FIG. 3, which will be discussed in detail below. Neural networks for use in OCR applications, typically contain a relatively large number of neurons in each of these layers, as well as in certain instances multiple hidden layers. However, to simplify the drawings and the following discussion, network 200 shown in FIG. 2, as well as network 400 shown in FIG. 4, is depicted as having only a small number of neurons in each of three layers. A neural network operates in the same manner regardless of the number of neurons it contains in each layer.

As shown in FIG. 2, each neuron has one or more inputs, but only one output. That output however may be upwardly distributed as input to one or more neurons in a successively higher layer. The inputs to network 200 are provided through leads 211, 212 and 213 collectively labelled as inputs 210 to input neurons located in input layer 220. Each separate input lead carries a bit for a separate pixel, $P_1$, $P_2$ and $P_3$, in an incoming bit-mapped pattern to network 200, specifically to input neurons 221, 222 and 223, respectively. For recognizing normalized characters within illustratively a 24-by-12 pixel array, 288 input neurons would be used in lieu of the three input neurons shown in FIG. 2. The output of each neuron in input layer 220 feeds an input to each neuron in hidden layer 230, the outputs of each of these latter neurons, in turn, feed an input of each of the neurons in output layer 240. Each input between neurons in layers 220 and 230, and between layers 230 and 240 is weighted by a coefficient, w. The weights for the hidden layer neurons are shown as neural weights $w_{ji}$ and collectively labelled as weights 225; while those for the output layer neurons are shown as neural weights $w_{kj}$ and collectively labelled as weights 235. The actual numeric subscripts on each weight shown in FIG. 2 identify the particular neural pair to which that weight is associated: the first subscript identifies a recipient neuron in that pair, while the second subscript identifies a sending neuron in that pair with the weight defining the proportionate connection occurring therebetween. The output value produced by each neuron is a continuous value, either analog or in the preferred embodiment, implemented through a DSP circuit, a multi-bit digital value. The output values generated by all the output neurons collectively form the output of network 200, here shown as outputs 281, 282, 283 and 284 emanating from respective output neurons 241, 242, 243 and 244. The number of neurons in the output layer typically equals the number of different characters that the network is to recognize. For example, output neuron 241 is associated with the letter "A", output neuron 242 with the letter "a", output neuron 243 with the letter "B", and output neuron 244 with the letter "b". In OCR applications for recognizing machine printed alphanumeric characters, approximately fifty different output neurons would be used in lieu of the four output neurons shown in FIG. 2, with each output neuron being associated with a different alphanumeric symbol (e.g. letter, number, or punctuation mark) to be recognized. The number of neurons in the hidden layer depend, inter alia, upon the complexity of the character bit-maps to be presented to the network for recognition; the desired information capacity of the network; the degree to which the network, once trained, is able to handle unfamiliar patterns; and the number of iterations, as discussed below, that the network must undergo during training in order for all the network weights to properly converge. For OCR applications of the type discussed above, hidden layer 230 contains approximately 75 neurons instead of the four hidden neurons shown in FIG. 2.

The total input, I, to any neuron, $a_k$, in the network is typically calculated as a function of the sum of its weighted inputs and a bias value, $\theta$, as given by equations (1) and (2) below:

for output neurons, $a_k$:

$$I(a_k) = \sum_j (O_j w_{kj}) + \theta_k, \text{ for all } j \tag{1}$$

for hidden neurons, $a_j$:

$$I(a_j) = \sum_i (O_i w_{ji}) + \theta_j, \text{ for all } i \tag{2}$$

The output, O, of a neuron is a function of its input, I (a), as given by equation (3) as follows:

$$O(a) = f[I(a)] \tag{3}$$

The function f, the so-called activation function, provides a continuous threshold. This function is typically a sigmoid function; it is S-shaped, monotonically increasing and asymptotically approaches fixed values typically +1, and zero or −1 as its input respectively approaches positive or negative infinity. The sigmoid function and the individual neural weights and bias values determine the response or "excitability" of the neuron to signals presented to all its inputs. The function that is used as the activation function is not critical as long as the function maps the total neural input, I (a), into a continuous monotonically increasing range between the asymptotic values zero or −1, and +1 for input values of negative or positive infinity, respectively. With a sigmoid function, the output of a neuron, e.g. O ($a_k$), is given by equation (4) as follows:

$$O(a_k) = \frac{1}{1 + e^{-(a_k)}} = \frac{1}{1 + e^{-(\sum_j (O_j w_{kj}) + \theta_k)}} \text{ for all } j. \tag{4}$$

As noted, operation of a neural network generally involves two distinct successive procedures: initialization and training on known pre-defined character bit-map patterns having known outputs followed by recognition of actual unknown input character bit-map patterns.

First, to initialize network 200, the weights of and bias values of all the neurons situated therein are set to random values typically within certain fixed bounds, such as illustratively ±0.5. Thereafter, network 200 is trained. Specifically, network 200 is successively presented with pre-defined input bit-maps, i.e. so-called training patterns, for which the associated characters are known. For each such pattern, all the weights, w, and bias values, $\theta$, in network 200 are adjusted such that the output of the network for each individual bit-map in that training pattern approximately matches the desired corresponding network output for this pattern. Once training is complete, all the weights and bias values are fixed at their current values. Thereafter, the network can be used to recognize unknown input character patterns. During pattern recognition, unknown bit-maps are successively applied in parallel to inputs 210 of network 200 and resulting corresponding network responses are taken from the output nodes in output layer 240. Ideally speaking, once network 200 recognizes an unknown input bit-map to be a given character on which this network was trained, then the output value produced by the neuron in output layer 240 and associated with that character should sharply increase relative to the output values produced by all the other neurons in the output layer.

Through the use of back propagation, a pre-defined input training pattern (input vector) is presented to the network and is propagated forward through the network in order to produce a corresponding output pattern (output vector, O) at the output neurons. The error associated therewith is determined and then back propagated through the network to apportion this error to the individual neurons in the network. Thereafter, the weights and biases for each neuron are adjusted in a direction and by an amount that minimizes the total network error for this input training pattern. This procedure is then repeated for the next training pattern, and so on.

Specifically, for a given input training pattern, the error for each neuron in the network is determined using the so-called "generalized delta rule". Through this rule, the error attributable to any neural weight, for example weight $w_{kj}$, for a given input training pattern, p, is proportional to the partial derivative of the sum-squared error for the network (i.e. the error, $E_p$, resulting from all neurons), as follows:

First, the total network error, E, for input pattern p is defined by:

$$E_p = \frac{1}{2} \sum (t_k - O_k)^2, \text{ for all } k \tag{5}$$

where: $t_k$ represents the target output value for neuron k. Given this, the network error with respect to any weight, e.g. weight $w_{kj}$, is given by the partial derivative, $\partial E_p / \partial w_{kj}$, of the total network error, $E_p$, with respect to a change in that weight. From this, the error, $\delta_k$, for each output neuron, $a_k$, can be determined as a function of the corresponding actual value, $t_k$, and target value, $O_k$, and the difference therebetween for that neuron, as follows:

$$\delta_k = O_k(1 - O_k)(t_k - O_k) \tag{6}$$

and for a hidden neuron, as follows:

$$\delta_j = O_j(1 - O_j) \sum_k (\delta_k w_{kj}) \text{ for all } k. \tag{7}$$

The errors defined by equations (6) and (7) for respectively each output and hidden neuron are determined by back error propagation determination component 260. Error is propagated backwards through the network to successively lower layers until the input layer is reached. In determining these neural error values, component 260 is supplied with the current output vector, via leads 250; the current neuron weight and bias values ($w_{kj}(n)$, $w_{ji}(n)$ and $\theta_j(n)$), via leads 267; and the target output neuron values ($t_k$) via leads 263. To prevent a large value for being generated for any weight, the target value for each individual output neuron is generally set to either 0.1 or 0.9.

After the neural errors are determined by component 260, these errors are routed, via leads 265, to neural weights and bias values determination component 270. Once all the neural errors are determined, component 270 determines the change (adjustment) that is required for each current neural weight and bias value in every layer. Component 270 assigns the largest portions of the total error to those weights and biases that are most responsible for generating the total network error. From the neural errors, the weight and bias value changes for current iteration n+1 are determined in accordance with the following equations:

for each output neuron, $a_k$:

$$\Delta w_{kj}(n+1) = \eta \, \delta_j O_k + \alpha \, \Delta w_{kj}(n) \qquad (8)$$

$$\Delta \theta_j(n+1) = \eta \, \delta_j + \alpha \, \Delta \theta_j(n) \qquad (9)$$

o and for each hidden neuron, $a_j$:

$$\Delta w_{ji}(n+1) = \eta \, \delta_j O_k + \alpha \, \Delta w_{ji}(n) \qquad (10)$$

$$\Delta \theta_j(n+1) = \eta \, \delta_i + \alpha \, \Delta \theta_j(n) \qquad (11)$$

Coefficient $\eta$ specifies the rate at which the network learns, i.e. it determines how fast the network weights and biases will converge during network training. If the value of this coefficient is too large, then these weights and biases will tend to overshoot their correct value, thereby inhibiting convergence. Coefficient $\alpha$ is similar to a momentum term in that it smooths the effect of sharp changes (tends to filter out high frequency variations) in weight values while allowing the network to ride through a local but not an absolute minimum along an error surface in weight space. The values of these coefficients are empirically determined. Once these weight and bias changes are calculated, component 270 applies these changes, via leads 272 and 274, respectively, to all the individual neurons in the network in order to update the neural weights and bias values accordingly. This recursive process of adjusting the network weights and bias values based upon the error between the target output vector and the actual output vector implements a process of gradient descent which effectively minimizes the sum-squared error, as defined in equation 5 above, for network 200. For a detailed explanation of back propagation in neural networks, see D. J. Burr, "A Neural Network Digit Recognizer", *Proceedings of the 1986 IEEE International Conference of Systems, Man and Cybernetics, Atlanta, Ga.*, pages 1621-1625; and Chapter 8, "Learning Internal Representations by Error Propagation" of D. E. Rumelhart et al, *Parallel Distributed Processing*, (©1986: MIT Press; Cambridge, Mass.) and particularly pages 322-330 therein. Also, for a detailed discussion of the mathematics underlying a neuron and a neural network, such as network 200, the reader is referred to N. J. Nilsson, *The Mathematical Foundations of Learning Machines* (©1990: Morgan Kaufmann Publishers; San Mateo, Calif.) and particularly section 2.6 "The Threshold Logic Unit (TLU)" on pages 21-23 and Chapter 6 "Layered Machines" on pages 95-114 thereof, respectively.

Once all the network weights have been adjusted for one training character bit-map, the next training character bit-map is presented to the network and the error determination and weight adjusting process iteratively and recursively repeats for each successive training bit-map. Typically, once the total network error for each of these training patterns reaches a pre-defined limit, these iterations stop and training halts. At this point, all the weight and bias values for network 200 are fixed at their then current values. Thereafter, character recognition on unknown input data using network 200 can occur at a relatively high speed.

A high level block diagram of a typical neuron 300 utilized in neural network 200 (as well as in my inventive neural network 400) is shown in FIG. 3. As described, each neuron generates a function, specifically a bounded threshold, of the sum of its weighted inputs and a bias value. As specifically shown in FIG. 3, neuron 300 is fed with inputs 310 that are formed of separate input values $IN_1$, $IN_2$, $IN_3$, ..., $IN_n$. These values are routed by associated individual leads $310_1$, $310_2$, $310_3$, ..., $310_n$ to corresponding multipliers $330_1$, $330_2$, $330_3$, ..., $330_n$, which collectively form multipliers 330. These multipliers multiply the input values by associated weights $w_1$, $w_2$, $w_3$, ..., $w_n$ and apply the resulting products, via leads 340, to respective inputs of summer 350. This summer combines these all the weighted values together with a bias value, $\theta$, appearing on lead 355 to form a sum. This sum is then routed, via lead 360, to an input of threshold element 370. This element implements a pre-defined continuous asymptotic function, typically and preferably a sigmoid function, which maps its input values into corresponding output values between illustratively between +1 and 0. The output, O, of element 370 is applied, via leads 375, as the output of neuron 300. Although in my preferred embodiment, each neuron is implemented in software executing within a DSP circuit, each such neuron could also be implemented using analog or digital circuitry. Moreover, an entire network of such neurons can be formed using a specialized digital circuit, such as an appropriate application specific integrated circuit (ASIC) or custom very large scale integrated circuit(s) (VLSI) that contains appropriate active elements and an interconnect matrix. Further implementations of a neural network, such as optical implementations, that contain neurons having the same functionality as neuron 300 are described in Chapter 4 "Implementation of Neural Networks", pages 4-1 to 4-26 in R. K. Miller, *Neural Networks* (©1989: Fairmont press; Lilburn, Ga.).

With this understanding of the functioning of a typical neural network known in the art, specifically network 200, and that of each neuron used in that network, I will now address the details of my inventive neural network 400. Inasmuch as most of the components of network 400 are the same as those in network 200, the discussion will only address the differences existing between these two networks.

FIG. 4 shows a high level block diagram of an embodiment of my inventive neural network 400. In addition to the components contained within network 200, network 400 contains confidence measurer and back propagation control component 410. Using the vector of output values produced by network 400 for each input bit-mapped character applied to network inputs 210, component 410 calculates an accompanying output confidence measure for this vector. The measure is determined as the ratio between the largest and second largest output values in this vector. This measure is then thresholded with the result being applied as a control signal over lead 450 to back propagation error determination component 260 to either permit back propagation and neural weight and bias adjustment to occur during input character recognition, i.e. to allow the network to re-train itself to the actual bit-map of the current input character being recognized, or inhibit their occurrence and prevent such re-training from occurring.

If network 400 confidently recognizes an input character, a pronounced peak, e.g. greater than or equal to the value 0.8, should occur in the output vector and be associated with only one output neuron. The values produced by the other output neurons should remain relatively low, e.g. less than or equal to the value 0.3. One illustrative output vector for network 400 shown in FIG. 4 and having a high output confidence would be (0.3, 0.2, 0.8, 0.2). With such an output vector, the network has confidently recognized an input bit-map to be the letter "B". The value of the confidence measure for this output vector will be relatively high, in this case 0.8/0.3 or approximately 2.67. Alternatively, if network 400 is not confident of its output, then the output vector will contain a cluster of neural output values located at or near the maximum value in the vector. For network 400 shown in FIG. 4, one illustrative output vector having a low confidence would be (0.4, 0.76, 0.8, 0.6). The confidence measure for this output vector is relatively low at 0.8/0.76 or approximately 1.05.

Component 410 contains output selectors 420, ratiometric calculator 430 and threshold component 440. Output selectors 420 receive, via leads 250, the output vector generated by output network 400 and select the largest and next largest values contained in this vector. These values, ($n_1$, $n_2$), are then applied, via lead 425, to ratiometric calculator 430 which determines the ratio, $n_1/n_2$, therebetween. The resulting ratiometric value is applied, via lead 435, to an input of threshold component 440. Component 440 compares the ratiometric measure against pre-defined limit values, applied via lead 437, for various confidence ranges, as describe in detail below in conjunction with FIG. 5, to determine whether network 400 has recognized the current character (symbol) applied as input thereto with a sufficient output confidence. If the ratiometric measure lies within a pre-defined range, threshold component 440 applies a high level signal to lead 450 to instruct back propagation error determination component 260 to determine neural errors and thereafter accordingly adjust neural weights and bias values. This range is situated between limits that define a upper range of high output confidence values and a lower range of low confidence values. Here, the target values used in determining neural error values, as given by equations (6) and (7) above, for any recognized output character are taken to be those in the specific target vector that was previously used (during the initialization and training procedure) in initially training the network to recognize that output character. During this procedure, component 260 stores all these target values for every character on which the network is initially trained. Now, by using the actual input bit-map to re-train the network during its recognition of actual input characters in lieu of using a pre-defined bit-map as would occur during the initial network training (i.e. during the initialization and network training procedure), the response of the network smoothly and accurately adapts to the changes in the actual input characters applied to the network.

No network training is needed for any character recognized with a confidence measure lying within the high confidence range, since the bit-map of that character has not appreciably changed and any subsequent improvement to the response of the network through re-training will be minimal, if at all. As such, for any actual input character recognized with a sufficiently high degree of confidence, threshold component 440 applies a low level signal to lead 450 to inhibit back propagation and adjustment of neural weight and bias values. Alternatively, if the network recognizes an input character with a low confidence measure, i.e. within the lower confidence range, then threshold component 440 also produces a low value on lead 450 to inhibit re-training. In this case, the output character contains sufficient uncertainty such that the network should not be re-trained on this character, else the performance of the network would be skewed in the wrong direction and recognition accuracy would likely degrade. Whenever an output confidence measure lies within the low confidence range, threshold component 440 also provides a high level as a Low Confidence Flag onto lead 490. In response to the occurrence of this high level, network post-processor 170 (see FIG. 1) marks (flags) the output character simultaneously being produced by neural network 400 and applied to this processor as a character that was recognized with low confidence, is potentially erroneous and might be re-classified during a second pass through the network.

Restricting the training of neural network 400 to actual input character data that has been recognized with a certain, though not excessive, level of output confidence, in accordance with the specific teachings of my invention, assures that the network undergoes re-training not only when the bit-map of this character has changed by a sufficient margin but also where the network is probably still able to correctly recognize this character. Limiting network re-training to occur under this condition will likely improve recognition accuracy. This improvement is likely to illustratively arise in processing those specific input characters which might be recognized erroneously at first but after network re-training might be differently and correctly classified when subsequently re-applied to the input of the network—either, for example, while the current page of the input document is being applied to the network during a second pass therethrough or while each subsequent input page containing the same character is first applied to the network.

Figure 5:
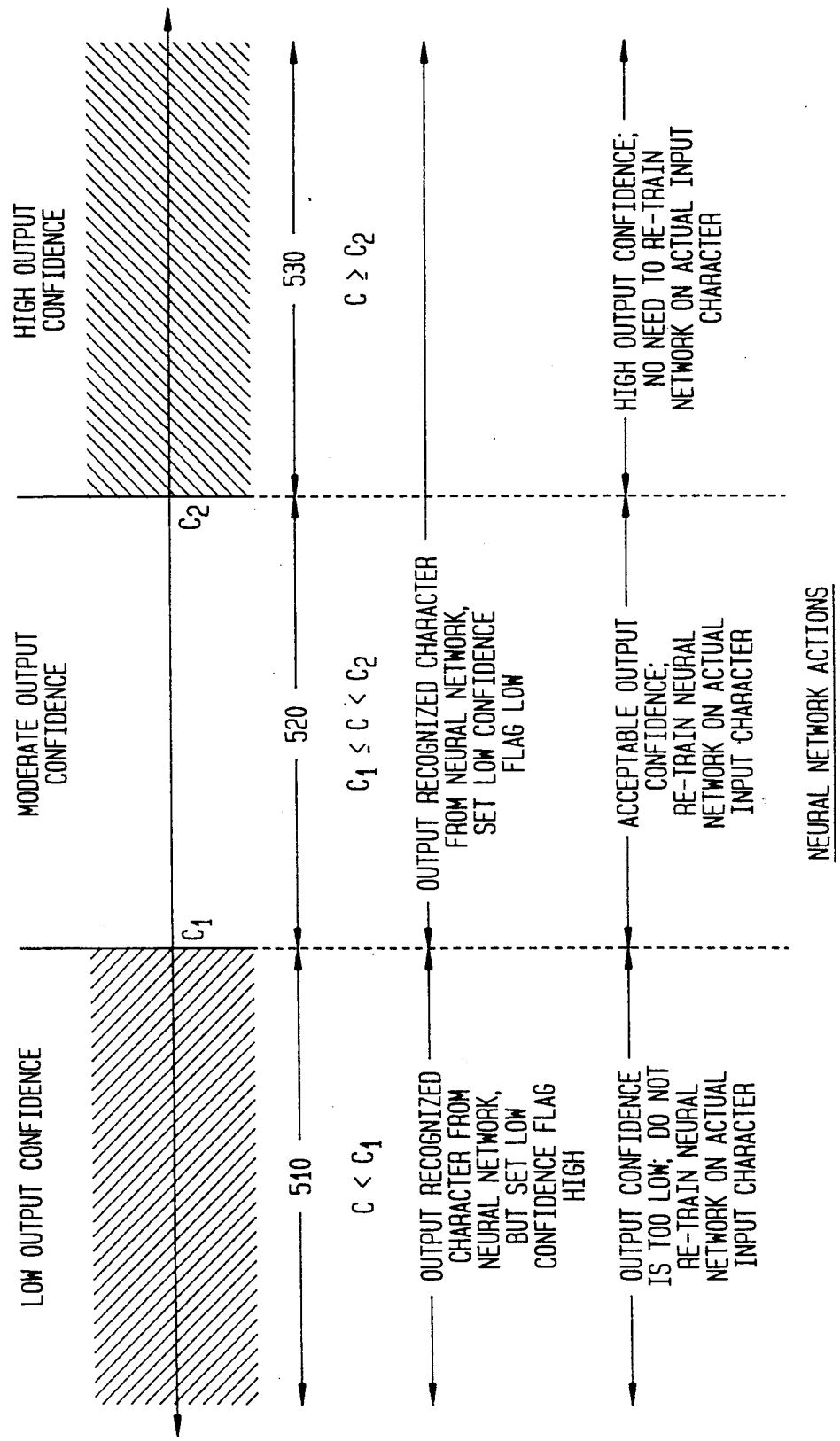
FIG. 5 graphically depicts ranges of output confidence measurement values and corresponding actions taken by my inventive neural network in response to an output confidence measurement value lying within any such range.

With this in mind, FIG. 5 graphically depicts ranges of output confidence measurement values and corresponding actions taken by my inventive neural network in response to an output confidence measurement value lying within any such range. As shown, three ranges of output confidence measurement values are established: low output confidence range 510 having a pre-defined upper output confidence measure limit of $C_1$, moderate output confidence range 520 bounded by pre-defined output confidence measurement limits $C_1$ and $C_2$, and high output confidence 530 having a pre-defined lower output confidence measure limit of $C_2$. These limit values are not critical and are empirically set to permit smooth and accurate network adaptation to changes in the input data applied thereto. If an actual output confidence measure, C, lies within low output confidence region 510 (i.e. $C<C_1$), my inventive neural network will apply the recognized character to the network output and also apply a high level to the Low Confidence Flag. In addition, since sufficient uncertainty exists in the recognized character, the network will not re-train itself on this character. Alternatively, if the actual output confidence measure, C, lies within moderate output confidence range 520 (i.e. $C_1 \leq C < C_2$) or within high confidence range 530 (i.e. $C \geq C_2$), then my inventive network will apply the recognized character to the network output. Since this character was recognized with sufficient output confidence, the network will apply a low level to the Low Confidence Flag. Now, if the output confidence measure lies within moderate confidence range 520, the inventive neural network will re-train itself on the current recognized character. Given an output confidence measure in this range, it is expected that, although the bit-map for this character has changed somewhat, nevertheless the present input character was recognized with sufficient confidence, then, through re-training using the actual bit-map for this character, the recognition accuracy provided by the network should likely and subsequently improve as the network adapts its performance to this change in the input data. This improvement will permit correct re-classification of the subsequent input characters that might have been erroneously recognized at first. Now, in the event that the actual output confidence measure lies within high output confidence range 530, my inventive neural network will not re-train itself on the current recognized character. For any actual output confidence measure lying within range 530, it is highly unlikely that: (a) the bit-map for this input character has changed enough to warrant network re-training and (b) network recognition accuracy will subsequently increase by an noticeable amount, if any.

A high level flowchart for Dual Pass Character Recognition and Back Propagation Control Routine 600 which implements my inventive character recognition process in software and which utilizes a software embodiment of my inventive neural network shown in FIG. 4 is collectively depicted in FIGS. 6A-6D; the correct alignment of the drawing sheets for these figures is shown in FIG. 6.

Within routine 600, an Initialization and Training Procedure containing blocks 603 and 606 is first executed followed by execution of a Recognition Procedure formed of blocks 612-690. The initialization and training procedure initializes the network and then trains the network on known pre-defined character bit-map training patterns having known outputs. Recognition of actual unknown input character bit-map patterns occurs during the Recognition Procedure.

Upon entry into routine 600, execution first proceeds to the Initialization and Recognition Procedure and specifically to block 603 therein. This block, when executed, initializes the neural network by setting all the neural weights and biases to random values lying within pre-defined corresponding fixed limits, such as illustratively ±0.5; these limit values are not critical. Thereafter, block 606 is executed to permit the network to train itself, as described above, using back propagation and weight and bias adjustments on successive known pre-defined character bit-map training patterns having known outputs. Once this training is completed, the Initialization and Training Procedure is concluded with execution proceeding to the Recognition Procedure and specifically to block 612 therein.

Block 612, when executed, instructs front-end processor 110 (see FIG. 1) to establish appropriate paths through I/O switch 140 to access the first page of actual unknown input bit-mapped character data to be recognized. Once these paths have been established, execution proceeds, as shown in FIGS. 6A-6D, to block 615, which, when executed, sets the value of variable PASS to one. This setting signifies that the present page is being processed via the first pass through the neural network. Once this variable has been set, block 618 is executed. This block reads the bit-map of the first character in the present page. Thereafter, execution proceeds to block 621 which, when executed, applies the values of the individual bits in this bit-map to appropriate input neurons of neural network 400 (see FIGS. 1 and 4). Thereafter, as shown in FIGS. 6A-6D, block 624 is executed to propagate the value of the bits in this bit-map forward through the neural network and, through so doing, calculate the output of each neuron in the network. Once the output values for the output neurons in the network have been determined, the bit-map has fully propagated through the network and execution proceeds to block 627. This block selects the largest and next largest values ($n_1$, $n_2$) currently produced by all the output neurons and appearing in the output vector. With these selections made, block 630 is executed to calculate the ratio between these two values. The value of this ratio is the actual output confidence measure, C, for the character currently recognized by the network.

Once the confidence measure has been determined, execution proceeds from block 630 to decision block 633. This decision block, when executed, compares the value of the actual confidence measure against the lower limit, $C_2$, of the high output confidence range. In the event the value of the actual confidence measure equals or exceeds the limit value $C_2$, execution proceeds, via the YES path emanating from decision block 633, to block 640. This latter block, when executed, applies the recognized character as the output of the network. If this character has been marked as having been previously recognized with a low confidence, then this marking is now removed. Execution then proceeds to block 643. This block, when executed, inhibits the back propagation and neural weight and bias adjustment processes, as fully explained above, from occurring for the neural network. Here, the actual output confidence is sufficiently high such that little, if any, visible improvement in network recognition accuracy will result from network re-training on the presently recognized character. Execution next proceeds, via paths 645 and 658 to block 667, which will be discussed below. Alternatively, if the value of the actual confidence measure is less than the value $C_2$, execution proceeds, via the NO path emanating from decision block 633, to decision block 647. This latter decision block, when executed, compares the value of the actual confidence measure against limits, $C_2$ and $C_1$, of the moderate output confidence range. In the event the value of the actual confidence measure lies within the moderate output confidence range, then execution proceeds, via the YES path emanating from decision block 647, to block 650. This latter block, when executed, applies the recognized character as the output of the network. If this character has been marked as having been previously recognized with a low output confidence, then this marking is now removed. Once block 650 has fully executed, execution proceeds to block 653. This latter block, when executed, activates the back propagation process, as fully explained above, for the neural network to determine the error for each neuron in the network. Incomputing the neural errors here, this process uses the bit-map of the input character currently applied to the network—rather than a pre-defined bit-map for this character as used during initial network training—and a corresponding pre-defined target vector for the output character presently recognized by the network and used during the Initialization and Training Procedure. After these errors have been completely determined, block 653 calculates new values for all the neural weight and bias values, as described above, and then adjusts all the values for the neural weights and biases accordingly. Once execution is completed for this block, the neural network will have been re-trained using the results of the recognition of the actual unknown character presently applied to the network. Execution then proceeds, via paths 655 and 658 to block 667.

In the event that the actual output confidence measure lies below limit $C_1$, indicating that actual confidence measure lies within the low output confidence range, then execution proceeds, via the NO path emanating from decision block 647 to block 661. This latter block, when executed, applies the recognized character as the output of the network and marks this character as having been recognized with low output confidence. Thereafter, execution proceeds to block 664 which, when executed, inhibits the back propagation and neural weight and bias adjustment processes, as fully explained above, from occurring for the neural network. Here, the actual output confidence for this recognized character is too low such that if the network were to be re-trained using its current output vector, network recognition accuracy might significantly degrade. Execution next proceeds from block 664 to decision block 667.

Decision block 667 determines whether the last character on the present input page that has been reached and processed through the neural network. In the event that more input characters remain on this page to be processed through the network, then execution proceeds, via the NO path emanating from decision block 667, to block 670. Block 670, when executed, reads the bit-map for the next successive character on the present page through I/O switch 140 (see FIG. 1). Once this bit-map has been obtained, execution loops back, as shown in FIGS. 6A–6D, via path 673, to block 621 to process this bit-map through the neural network and so on for successive input characters. Alternatively, in the event that the last character on the present page has been reached and processed through the neural network, then decision block 667 routes execution to decision block 677. This latter decision block tests the value of variable PASS to determine whether the present page has been passed twice through the neural network, i.e. whether the value of variable PASS equals two. If only the first pass through the network has occurred for this page, then decision block 677 routes execution, via its NO path, to block 680. This latter block, when executed, sets the value of variable PASS to two. Thereafter, execution loops back, via path 683, to block 618 to successively apply the character bit-maps appearing on this page as a second pass through the neural network. Alternatively, in the event that the second pass for the present page has now been completed, then decision block 677 routes execution to decision block 687. This latter decision block determines whether the last page in the document currently being recognized has been processed. If any pages remain to be processed, then decision block 687 routes execution, via its NO path, to block 690. When executed, block 690 instructs front-end processor 110 (see FIG. 1) to establish appropriate paths through I/O switch 140 to access the next page of input bit-mapped character data in the current document. Thereafter, execution loops back, via path 693, to block 615 to process this next page and so on. If, however, the last page of the current document has been processed, then the Recognition Procedure is completed and execution merely exits from routine 600, via the YES path emanating from decision block 687.

Even though my invention has been described in terms of an OCR system for recognizing and classifying normalized machine printed alphanumeric characters, my inventive neural network can be used to recognize and classify patterns that occur in a wide variety of different systems. These patterns are not limited to pixel patterns for alphanumeric characters, but instead can be any pre-defined signal pattern that can be produced by a group of input sensors or which occurs in a given single or multi-bit data stream or even in a group of analog signals. In order to handle different inputs than pixel signals, those skilled in the art readily appreciate that appropriate interface circuitry would need to be added to my inventive network in order to couple the individual input signals to the proper input neurons in the network. Also, the programming of the network post-processor would need to be modified to reflect the digital output word for each specific pattern that is to be recognized and its associated corresponding output neuron in the network.

Moreover, although my inventive network has been illustratively described in terms of operating on non-encoded input and output data, i.e. where the network input is merely a bit-map with no higher data granularity occurring among the bits and the output of the network is only taken to be a single neuron having the highest output value, the network inputs and outputs need not be so constrained. In this regard, the input data applied to the network could be encoded into multi-bit words, as needed, and the network appropriately trained and re-trained thereon. Similarly, the output of the network could produce encoded multi-bit outputs for each recognized pattern, as needed, in lieu of a single bit. Such a multi-bit pattern, of for example three bits, may be that associated with a set of three neurons that have the largest values at any one time. An output confidence measure could then be calculated as a function of the ratiometric relationship or measure of the numeric difference between the most and next most likely output of the network. For example, this function might involve determining the ratio of an average of the three highest output values (for the character most likely recognized by the network for a current input) in a current output vector with respect to an average of the next three highest output values in this vector (for the next most likely character recognized by the network for the same input). The value of the output confidence measure would then be used to control, in the manner described above, back error propagation and neural weight and bias adjustment. The specific function used to form the output confidence measure, e.g. averaging outputs from multiple output neurons and/or ratioing of single output neurons or averaged results, is not critical. However, to simplify processing, this function should be kept relatively simple and linear, and provide sufficient output sensitivity to input differences.

Furthermore, although for ease of illustration, I have discussed my invention in the context of a very small and simple neural network, the network can be expanded to include any number of neurons as well as more levels than just three. In this regard, the hidden layer can contain multiple levels. Also, connections can be made through appropriate weightings between neurons situated on non-adjacent levels of the network. Back propagation would still be accomplished in the same overall manner as described above and be inhibited, to prevent adaptive re-training on actual input data, in the event the confidence measure associated with the output of the network for any such data is too low or too high. Furthermore, although my inventive neural network has been described as being implemented in software, specifically through use of an integrated digital signal processor circuit, this network can easily be implemented with analog or mixed analog and digital circuitry, if desired.

Although various embodiments of my inventive neural network have been shown and described in detail herein, many other varied embodiments of this network as well as systems that utilize a network which incorporates the teachings of my invention may be easily constructed by those skilled in the art.

INDUSTRIAL APPLICABILITY AND ADVANTAGES

The present invention is not only useful in optical character recognition (OCR) systems but generally in a wide variety of systems that employs a neural network for pattern recognition. The invention advantageously provides a neural network that is capable of smoothly, rapidly and accurately adapting its performance to actual dynamically changing input data faster than that previously obtainable in the art thereby increasing the recognition speed, accuracy and throughput of the network. Furthermore, by broadening the entire base of training data to include actual dynamically changing input characters, the inventive neural network provides more robust performance than which heretofore occurs in neural networks known in the art.

I claim:

1. Apparatus for recognizing the existence of a plurality of patterns in unknown input data comprising:
   network means, responsive to unknown input data, for producing a plurality of output values that collectively identifies one of said patterns existing in said unknown input data, said network means having a plurality of numeric weights associated therewith;
   means, responsive to a control signal and to said plurality of output values and pre-defined output target values associated therewith for said one pattern, for determining changes in the value of each of said numeric weights and, in response thereto, for adjusting a value of each of said weights while said unknown input data is applied to said network means so as reduce error arising between said output values and said output target values for the unknown input data;
   means, responsive to said plurality of output values, for determining a confidence measure associated therewith; and
   means, responsive to said confidence measure, for generating said control signal so as to enable said determining and adjusting means during pattern recognition to determine said changes and adjust the values of said weights when said confidence measure has a numeric value lying within a pre-defined numeric range so that network training does not occur during pattern recognition whenenver the confidence measure associated with the output values produced for said one pattern is either greater or less than said numeric range whereby said network means is trained to recognize said pattern in the event the pattern deviates from a pre-defined pattern.

2. The apparatus in claim 1 wherein said network means comprises a network having an inter-connected hierarchy of neurons responsive to said unknown input data for recognizing the patterns therein and, in response thereto, providing said output values; said hierarchy having input, hidden and output layers formed of different ones of said neurons with pre-defined pairs of said neurons being inter-connected with a corresponding one of said numeric weights associated therewith.

3. The apparatus in claim 2 wherein each of said neurons has a neural output and a neural input and provides a neural output value as a thresholded function of the neural input, and wherein each of said neurons in said hidden and output layers comprises:
   means, responsive to a plurality of neural input signals, for multiplying each of said neural input signals by a corresponding one of said numeric weights to form weighted neural input signals;
   means, responsive to said weighted neural input signals, for forming a sum of said neural input signals; and
   means for thresholding said weighted sum by a pre-defined continuous threshold function to provide the neural output.

4. The apparatus in claim 3 wherein said unknown input data comprises a plurality of input values, each of said input values being applied as a neural input signal to an associated and different one of said neurons in said input layer; and said plurality of output values are collectively formed of the neural output values produced by all of said neurons in the output layer.

5. The apparatus in claim 4 wherein the neural output of each one of said neurons in said input layer is connected to one of the neural inputs of every one of said neurons in said hidden layer and the neural output of each of said neurons in said hidden layer is connected to one of the neural inputs of every one of said neurons in said output layer.

6. The apparatus in claim 5 wherein said unknown input data is a bit-map having a pre-defined number of pixels, wherein a value of each of said pixels being applied as the neural input to an associated and different one of said neurons in said input layer.

7. The apparatus in claim 3 wherein said continuous threshold function is a sigmoid function.

8. The apparatus in claim 3 wherein said sum comprises a bias value in addition to said weighted neural input signals, and wherein said determining and adjusting means, in response to said plurality of said output values and said pre-defined target values associated therewith, determines a change in the bias value for each of said neurons and, in response thereto, changes the bias value while said unknown input data is applied to said network means so as to reduce said error.

9. The apparatus in claim 1 further comprising training means, responsive to a pre-defined known input pattern and having pre-defined ones of neural output values associated therewith, for simultaneously applying said known pattern as said unknown input data and said pre-defined neural output values as said target output values, and for enabling said determining and adjusting means during a training period to determine said changes and adjust the values of said weights to minimize error arising between said output values and said output target values whereby said network means is trained to initially recognize said known pattern in said unknown input data.

10. The apparatus in claim 9 wherein said training means successively applies each of a plurality of pre-defined known input patterns as said unknown input data simultaneously with associated pre-defined neural output values as said target output values and enables said determining and adjusting means to determine said changes and adjust the values of said weights to minimize the error arising between said output values and said output target values for each of said known patterns whereby said network means is trained to initially recognize each of said known patterns in said unknown input data.

11. The apparatus in claim 10 wherein said network means further contains a plurality of numeric bias values associated therewith, and said determining and adjusting means, in response to said plurality of said output values and said pre-defined target values associated therewith, determines changes in the values of the weights and the bias values and, in response thereto, adjusts the values of said weights and the bias values while said unknown input data is applied to said network means so as to reduce said error arising between said output values and said output target values for each of said known input patterns.

12. The apparatus in claim 11 wherein said network means comprises a network having an inter-connected hierarchy of neurons responsive to said unknown input data for recognizing the patterns therein and, in response thereto, providing said output values; said hierarchy having input, hidden and output layers formed of different ones of said neurons with pre-defined pairs of said neurons being inter-connected with a corresponding one of said numeric weights associated therewith; and wherein each of said neurons has a neural output and a neural input and provides a neural output value as a thresholded function of the neural input, and wherein each of said neurons in said hidden and output layers comprises:

means, responsive to a plurality of neural input signals, for multiplying each of said neural input signals by a corresponding one of said numeric weights to form weighted neural input signals;

means, responsive to said weighted neural input signals and an associated one of bias values for said neuron, for forming a sum of said neural input signals and said associated bias value; and means for thresholding said weighted sum by a pre-defined sigmoid function to provide the neural output.

13. In an optical character reader, apparatus for recognizing the existence of a plurality of bit-mapped alphanumeric characters in unknown bit-mapped input data comprising:

network means, responsive to unknown bit-mapped input data, for producing a plurality of output values that collectively identifies one of said bit-mapped patterns existing in said unknown bit-mapped input data, said network means having a plurality of numeric weights associated therewith;

means, responsive to a control signal and to said plurality of output values and pre-defined output target values associated therewith for said one bit-mapped pattern, for determining changes in the value of each of said numeric weights and, in response thereto, for adjusting a value of each of said weights while said unknown bit-mapped input data is applied to said network means so as reduce error arising between said output values and said output target values for the unknown bit-mapped input data;

means, responsive to said plurality of output values, for determining a confidence measure associated therewith; and means, responsive to said confidence measure, for generating said control signal so as to enable said determining and adjusting means during pattern recognition to determine said changes and adjust the values of said weights when said confidence measure has a numeric value lying within a pre-defined numeric range so that network training does not occur during pattern recognition whenever the confidence measure associated with the output values produced for said one pattern is either greater or less than said numeric range whereby said network means is trained to recognize said bit-mapped pattern in the event the pattern deviates from a pre-defined bit-mapped pattern for an associated alphanumeric character.

14. The apparatus in claim 13 wherein said network means comprises a network having an inter-connected hierarchy of neurons responsive to said unknown input data for recognizing the bit-mapped patterns therein and, in response thereto, providing said output values; said hierarchy having input, hidden and output layers formed of different ones of said neurons with pre-defined pairs of said neurons being inter-connected with a corresponding one of said numeric weights associated therewith; and wherein each of said neurons has a neural output and a neural input and provides a neural output value as a thresholded function of the neural input, and wherein each of said neurons in said hidden and output layers comprises:

means, responsive to a plurality of neural input signals, for multiplying each of said neural input signals by a corresponding one of said numeric weights to form weighted neural input signals;

means, responsive to said weighted neural input signals, for forming a sum of said neural input signals; and means for thresholding said weighted sum by a pre-defined continuous threshold function to provide the neural output.

15. The apparatus in claim 14 wherein a value of each pixel in an input bit-map is applied as the neural input to an associated and different one of said neurons in said input layer, and said output values are collectively formed of the neural output values produced by all of said neurons in the output layer.

16. The apparatus in claim 15 further comprising training means, responsive to a pre-defined known bit-mapped pattern for a corresponding known alphanumeric character and having pre-defined ones of neural output values associated therewith, for simultaneously applying said known bit-mapped pattern as said unknown bit-mapped input data and said pre-defined neural output values as said target output values, and for enabling said determining and adjusting means to determine said changes and adjust the values of said weights to minimize error arising between said output values and said output target values whereby said network means is trained to initially recognize said known character in said unknown input data.

17. The apparatus in claim 16 wherein said training means successively applies each of a plurality of pre-defined bit-mapped patterns for corresponding known alphanumeric characters as said unknown bit-mapped input data simultaneously with associated pre-defined neural output values as said target output values and enables said determining and adjusting means during a training period to determine said changes and adjust the values of said weights to minimize the error arising between said output values and said output target values for each of said bit-mapped known patterns whereby said network means is trained to initially recognize each of said known characters in said unknown input data.

18. The apparatus in claim 17 wherein said network means further contains a plurality of numeric bias values associated therewith, and said determining and adjusting means, in response to said plurality of said output values and said pre-defined target values associated therewith, determines changes in the values of the weights and the bias values and, in response thereto, adjusts the values of said weights and the bias values while said unknown input bit-mapped data is applied to said network means so as to reduce said error arising between said output values and said output target values for each of said known characters.

19. A method for recognizing the existence of a plurality of patterns in unknown input data comprising the steps of:
producing, in response to unknown input data and through a network, a plurality of output values that collectively identifies one of said patterns existing in said unknown input data, said network having a plurality of numeric weights associated therewith;
determining, in response to a control signal and to said plurality of output values and pre-defined output target values associated therewith for said one pattern, changes in the value of each of said numeric weights and, in response thereto, adjusting a value of each of said weights while said unknown input data is applied to said network so as reduce error arising between said output values and said output target values for the unknown input data;
determining, in response to said plurality of output values, a confidence measure associated therewith; and
generating, in response to said confidence measure, said control signal so as to enable said determining and adjusting steps during pattern recognition to determine said changes and adjust the values of said weights when said confidence measure has a numeric value lying within a pre-defined numeric range so that network training does not occur during pattern recognition whenever the confidence measure associated with the output values produced for said one pattern is either greater or less than said numeric range whereby said network is trained to recognize said pattern in the event the pattern deviates from a pre-defined pattern.

20. The method in claim 19 wherein said network has a inter-connected hierarchy of neurons responsive to said unknown input data for recognizing the patterns therein and, in response thereto, providing said output values; said hierarchy having input, hidden and output layers formed of different ones of said neurons with pre-defined pairs of said neurons being inter-connected with a corresponding one of said numeric weights associated therewith; wherein each of said neurons has a neural output and a neural input and provides a neural output value as a thresholded function of the neural input, and wherein in each of said neurons in said hidden and output layers:
multiplying, in response to a plurality of neural input signals, each of said neural input signals by a corresponding one of said numeric weights to form weighted neural input signals;
forming, in response to said weighted neural input signals, a sum of said neural input signals; and
thresholding said weighted sum by a pre-defined sigmoid function to provide the neural output.

21. The method in claim 20 wherein said unknown input data comprises a plurality of input values, and said method further comprises the steps of:
applying each of said input values as a neural input signal to an associated and different one of said neurons in said input layer; and
collectively forming said plurality of output values as the neural output values produced by all of said neurons in the output layer.

22. The method in claim 21 wherein said sum comprises a bias value in addition to said weighted neural input signals, and wherein said determining and adjusting steps further comprises the step of determining, in response to said plurality of said output values and said pre-defined target values associated therewith, a change in the bias value for each of said neurons and, in response thereto, adjusting the bias value while said unknown input data is applied to said network so as to reduce said error.

23. The method in claim 20 further comprising the steps of:
training said network, in response to a pre-defined pattern for a corresponding known input pattern and having pre-defined ones of neural output values associated therewith, comprising:
simultaneously applying said pre-defined pattern as said unknown input data and said pre-defined neural output values as said target output values, and
enabling said determining and adjusting steps during a training period to determine said changes and adjust the values of said weights to minimize error arising between said output values and said output target values whereby said network is trained to initially recognize said known pattern in said unknown input data.

24. The method in claim 23 wherein said training step further comprises the steps of:
successively applying each of a plurality of pre-defined patterns for corresponding known input patterns as said unknown input data simultaneously with associated pre-defined neural output values as said target output values; and
enabling said determining and adjusting steps to determine said changes and adjust the values of said weights to minimize the error arising between said output values and said output target values for each of said training patterns whereby said network is trained to initially recognize each of said known patterns in said unknown input data.

25. The method in claim 24 wherein said network further contains a plurality of numeric bias values associated therewith, and said determining and adjusting step further comprises: determining, in response to said plurality of said output values and said pre-defined target values associated therewith, changes in the values of the weights and the bias values and, in response thereto, adjusting the values of said weights and the bias values while said unknown input data is applied to said network so as to reduce said error arising between said output values and said output target values for each of said known input patterns.

26. In an optical character reader, a method for recognizing the existence of a plurality of bit-mapped alphanumeric characters in unknown bit-mapped input data comprising:
producing, in response to unknown bit-mapped input data and through a network, a plurality of output values that collectively identifies one of said bit-mapped patterns existing in said unknown bit-mapped input data, said network having a plurality of numeric weights associated therewith;
determining, in response to a control signal and to said plurality of output values and pre-defined output target values associated therewith for said one bit-mapped pattern, changes in the value of each of said numeric weights and, in response thereto, adjusting a value of each of said weights while said unknown bit-mapped input data is applied to said network so as reduce error arising between said output values and said output target values for the unknown bit-mapped input data;
determining, in response to said plurality of output values, a confidence measure associated therewith; and
generating, in response to said confidence measure, said control signal so ass to enable said determining and adjusting steps during character recognition to determine said changes and adjust the values of said weights when said confidence measure has a numeric value lying within a pre-defined numeric range so that network training does not occur during character recognition whenever the confidence measure associated with the output values produced for said one pattern in either greater or less than said numeric range whereby said network is trained to recognize said bit-mapped pattern in the event the pattern deviates from a pre-defined bit-mapped pattern for an associated alphanumeric character.

27. The method in claim 26 wherein said network has a inter-connected hierarchy of neurons responsive to said unknown input data for recognizing the patterns therein and, in response thereto, providing said output values; said hierarchy having input, hidden and output layers formed of different ones of said neurons with pre-defined pairs of said neurons being inter-connected with a corresponding one of said numeric weights associated therewith; wherein each of said neurons has a neural output and a neural input and provides a neural output value as a thresholded function of the neural input, and wherein in each of said neurons in said hidden and output layers:
multiplying, in response to a plurality of neural input signals, each of said neural input signals by a corresponding one of said numeric weights to form weighted neural input signals;
forming, in response to said weighted neural input signals, a sum of said neural input signals; and
thresholding said weighted sum by a pre-defined function to provide the neural output.

28. The method in claim 27 comprising the steps of:
applying a value of each pixel in an input bit-map as a neural input signal to an associated and different one of said neurons in said input layer; and
collectively forming said plurality of output values as the neural output values produced by all of said neurons in the output layer.

29. The method in claim 28 further comprising the steps of:
training said network, in response to a pre-defined pattern for a known pattern of an alphanumeric character and having pre-defined ones of neural output values associated therewith, comprising:
simultaneously applying said pre-defined pattern as said unknown input data and said pre-defined neural output values as said target output values, and
enabling said determining and adjusting steps during a training period to determine said changes and adjust the values of said weights to minimize error arising between said output values and said output target values whereby said network is trained to initially recognize said known pattern in said unknown bit-mapped input data.

30. The method in claim 29 wherein said training step further comprises the steps of:
successively applying each of a plurality of pre-defined training patterns for corresponding known input patterns as said unknown input data simultaneously with associated pre-defined neural output values as said target output values; and
enabling said determining and adjusting steps to determine said changes and adjust the values of said weights to minimize the error arising between said output values and said output target values for each of said training patterns whereby said network is trained to initially recognize each of said known patterns in said unknown input data.

31. The method in claim 30 wherein said network further contains a plurality of numeric bias values associated therewith, and said determining and adjusting step further comprises: determining, in response to said plurality of said output values and said pre-defined target values associated therewith, changes in the values of the weights and the bias values and, in response thereto, adjusting the values of said weights and the bias values while said unknown input data is applied to said network so as to reduce said error arising between said output values and said output target values for each of said known input patterns.

32. In an optical character reader, a method for recognizing the existence of a plurality of bit-mapped alphanumeric characters in unknown bit-mapped input data comprising:
in a pattern recognition procedure:
producing, in response to unknown bit-mapped input data and through a network, a plurality of output values that collectively identifies one of said bit-mapped patterns existing in said unknown bit-mapped input data, said network having a plurality of numeric weights associated therewith;

determining, in response to a control signal and to said plurality of output values and pre-defined output target values associated therewith for said one bit-mapped pattern, changes in the value of each of said numeric weights and, in response thereto, adjusting a value of each of said weights while said unknown bit-mapped input data is applied to said network so as reduce error arising between said output values and said output target values for the unknown bit-mapped input data;

determining, in response to said plurality of output values, a confidence measure associated therewith; and generating, in response to said confidence measure, said control signal so as to enable said determining and adjusting steps during pattern recognition to determine said changes and adjust the values of said weights when said confidence measure has a numeric value lying within a pre-defined numeric range so that network training does not occur during pattern recognition whenever the confidence measure associated with the output values produced for said one pattern is either greater or less than said numeric range whereby said network is trained to recognize said bit-mapped pattern in the event the pattern deviates from a pre-defined bit-mapped pattern for an associated alphanumeric character; and in a training procedure:

applying the pre-defined bit-mapped pattern for an alphanumeric character as said unknown input data and corresponding pre-defined neural output values associated therewith as said target output values, and enabling said determining and adjusting steps during a training period to determine said changes and adjust the values of said weights to minimize error arising between said output values and said output target values whereby said network is trained to initially recognize said known pattern in said unknown bit-mapped input data; and executing said training procedure followed by said pattern recognition procedure.

33. The method in claim 32 wherein said network has a inter-connected hierarchy of neurons responsive to said unknown input data for recognizing the patterns therein and, in response thereto, providing said output values; said hierarchy having input, hidden and output layers formed of different ones of said neurons with pre-defined pairs of said neurons being inter-connected with a corresponding one of said numeric weights associated therewith; wherein each of said neurons has a neural output and a neural input and provides a neural output value as a thresholded function of the neural input, and wherein in each of said neurons in said hidden and output layers:

multiplying, in response to a plurality of neural input signals, each of said neural input signals by a corresponding one of said numeric weights to form weighted neural input signals;

forming, in response to said weighted neural input signals, a sum of said neural input signals; and thresholding said weighted sum by a pre-defined sigmoid function to provide the neural output.

34. The method in claim 33 wherein said unknown input data comprises a plurality of input values, and said method further comprises the steps of:

applying each of said input values as a neural input signal to an associated and different one of said neurons in said input layer; and collectively forming said plurality of output values as the neural output values produced by all of said neurons in the output layer.

35. The method in claim 34 wherein said sum comprises a bias value in addition to said weighted neural input signals, and wherein said determining and adjusting steps further comprises the step of determining, in response to said plurality of said output values and said pre-defined target values associated therewith, a change in the bias value for each of said neurons and, in response thereto, adjusting the bias value while said unknown input data is applied to said network so as to reduce said error.

36. The method in claim 32 further comprising successively executing the pattern recognition step twice for each page of an input document being recognized so as to improve recognition accuracy for that page.

* * * * *